(12) United States Patent
Kidani et al.

(10) Patent No.: US 12,519,951 B2
(45) Date of Patent: Jan. 6, 2026

(54) IMAGE DECODING DEVICE, IMAGE DECODING METHOD, AND PROGRAM

(71) Applicant: KDDI CORPORATION, Tokyo (JP)

(72) Inventors: Yoshitaka Kidani, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 18/594,887

(22) Filed: Mar. 4, 2024

(65) Prior Publication Data

US 2024/0214579 A1    Jun. 27, 2024

Related U.S. Application Data

(63) Continuation of application No. PCT/JP2022/042340, filed on Nov. 15, 2022.

(30) Foreign Application Priority Data

Nov. 18, 2021    (JP) .................................. 2021-188193

(51) Int. Cl.
*H04N 19/159* (2014.01)
*H04N 19/186* (2014.01)
*H04N 19/583* (2014.01)

(52) U.S. Cl.
CPC ......... *H04N 19/159* (2014.11); *H04N 19/186* (2014.11); *H04N 19/583* (2014.11)

(58) Field of Classification Search
None
See application file for complete search history.

(56) References Cited

U.S. PATENT DOCUMENTS

| | | | | |
|---|---|---|---|---|
| 10,812,806 | B2* | 10/2020 | Zhang | H04N 19/11 |
| 11,159,808 | B2* | 10/2021 | Zhang | H04N 19/159 |
| 11,418,803 | B2* | 8/2022 | Choi | H04N 19/105 |
| 11,445,189 | B2* | 9/2022 | Li | H04N 19/119 |
| 11,570,462 | B2* | 1/2023 | Zhang | H04N 19/176 |
| 2016/0330477 | A1* | 11/2016 | Kim | H04N 19/593 |
| 2020/0366924 | A1* | 11/2020 | Rusanovskyy | H04N 19/117 |
| 2020/0396484 | A1* | 12/2020 | Jeon | H04N 19/157 |

(Continued)

FOREIGN PATENT DOCUMENTS

| | | |
|---|---|---|
| JP | 2020108055 A | 7/2020 |
| JP | 2022162484 A | 10/2022 |

OTHER PUBLICATIONS

International Search Report (ISR) (and English translation thereof) dated Jan. 31, 2023, issued in International Application No. PCT/JP2022/042340.

(Continued)

*Primary Examiner* — Mohammad J Rahman
(74) *Attorney, Agent, or Firm* — Holtz, Holtz & Volek PC

(57) ABSTRACT

In an image decoding device (200) according to the present invention, a blending unit (243) blends, in a case where all of a geometric partitioning mode, overlapped block motion compensation, and luma mapping with chroma scaling are valid for a current block, and the geometric partitioning mode includes inter prediction and intra prediction, luma-mapped luma components of the motion compensation sample, the overlapped block motion compensation sample, and the intra prediction sample to generate a prediction sample for a luma component of the current block.

7 Claims, 19 Drawing Sheets

(56) References Cited

U.S. PATENT DOCUMENTS

| | | | |
|---|---|---|---|
| 2021/0029366 A1* | 1/2021 | Zhang | H04N 19/184 |
| 2021/0185354 A1 | 6/2021 | Kidani et al. | |
| 2021/0266537 A1* | 8/2021 | Zhang | H04N 19/583 |
| 2022/0038681 A1* | 2/2022 | Galpin | H04N 19/176 |
| 2022/0109847 A1* | 4/2022 | Zhao | H04N 19/46 |
| 2022/0109859 A1* | 4/2022 | Zhao | H04N 19/109 |
| 2022/0132130 A1* | 4/2022 | Ye | H04N 19/176 |
| 2022/0256174 A1* | 8/2022 | Zhao | H04N 19/186 |

OTHER PUBLICATIONS

Written Opinion (WO) dated Jan. 31, 2023, issued in International Application No. PCT/JP2022/042340.
"ITU-T H.266 Versatile Video Coding", Series H: Audiovisual and Multimedia Systems; Infrastructure of audiovisual services—Coding of moving video, 7.3.2.4 Sequence parameter set RBSP syntax, 7.3.11.7 Merge data syntax, Aug. 2020.
Chang, et al., "Compression efficiency methods beyond VVC", Joint Video Experts Team (JVET) of ITU-T SG 16 WP 3 and ISO/IEC JTC 1/SC 29. JVET-U0100. 21st Meeting, by teleconference. Jan. 2021. pp. 1-27.

* cited by examiner

FIG. 8

| MergeCandList [m, n] | L0 MV | L1 MV |
| --- | --- | --- |
| 0 | x |  |
| 1 |  | x |
| 2 | x |  |
| 3 |  | x |
| 4 | x |  |

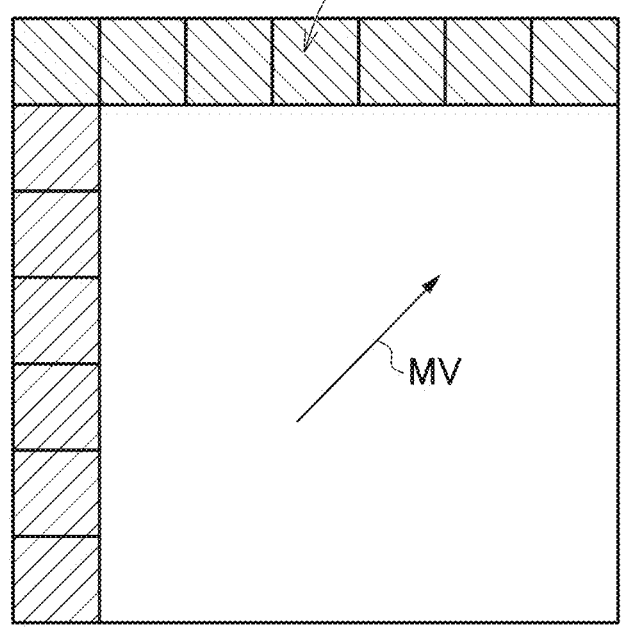

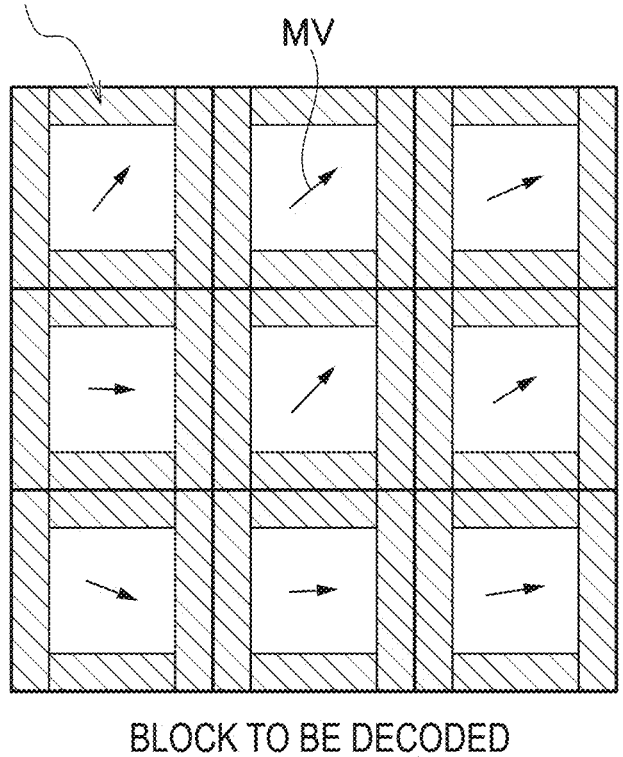

FIG. 14

Table 1 – Specification of angleIdx and distanceIdx based on merge_gpm_partition_idx

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

FIG. 15

Table 1 – Specification of the geometric partitioning distance array disLut

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | -2 | -4 | -4 | -8 | -8 |
| idx | 16 | 18 | 19 | 20 | 21 | 22 | 24 | 26 | 27 | 28 | 29 | 30 |
| disLut[idx] | -8 | -8 | -8 | -4 | -4 | -2 | 0 | 2 | 4 | 4 | 8 | 8 |

FIG. 17

| ANGLE OF PARTITION LINE OF GPM | 0 | 2 | 3 | 4 | 5 | 8 | 11 | 12 | 13 | 14 |
|---|---|---|---|---|---|---|---|---|---|---|
| PARTITIONED AREA A | A | A | A | A | L | L | L | L+A | A | A |
| PARTITIONED AREA B | L+A | L+A | L+A | L | L | L | L | L+A | L+A | L+A |
| ANGLE OF PARTITION LINE OF GPM | 16 | 18 | 19 | 20 | 21 | 24 | 27 | 28 | 29 | 30 |
| PARTITIONED AREA A | A | A | A | A | L+A | L+A | L+A | L+A | A | A |
| PARTITIONED AREA B | L+A | L+A | L+A | L | L | L | L | L+A | L+A | L+A |

FIG. 18

IMAGE DECODING DEVICE, IMAGE DECODING METHOD, AND PROGRAM

CROSS-REFERENCE TO RELATED APPLICATIONS

The present application is a continuation of PCT Application No. PCT/JP2022/042340, filed on Nov. 15, 2022, which claims the benefit of Japanese patent application No. 2021-188193 filed on Nov. 18, 2021, the entire contents of which are incorporated herein by reference in its entirety.

TECHNICAL FIELD

The present invention relates to an image decoding device, an image decoding method, and a program.

BACKGROUND ART

Non Patent Literature 1 discloses a geometric partitioning mode (GPM).

The GPM diagonally partitions a rectangular block into two areas and performs motion compensation on each of the two areas. Specifically, in the GPM, each of the two partitioned areas is motion-compensated by a motion vector of a merge mode, and is blended by a weighted average. 64 patterns are prepared as diagonal partitioning patterns according to an angle and a displacement.

In addition, Non Patent Literature 1 discloses luma mapping with chroma scaling (LMCS). The LMCS is a technique of performing transform/quantization in a coding processing technique in a signal space different from an input image signal.

Furthermore, Non Patent Literature 2 discloses overlapped block motion compensation (OBMC). The OBMC is a technique of performing weighted averaging of a motion compensation (MC) sample of a current block by using a motion compensation sample (OBMC sample) using a motion vector of a block adjacent to the current block according to a distance from a boundary between the blocks.

CITATION LIST

Non Patent Literature

Non Patent Literature 1: ITU-T H.266/VVC
Non Patent Literature 2: JVET-U0100, "Compression Efficiency Methods Beyond VVC"

SUMMARY OF THE INVENTION

However, since the GPM disclosed in Non Patent Literature 1 is limited to inter prediction, there is a problem that there is room for improvement in coding performance.

Therefore, the present invention has been made in view of the above-described problems, and an object of the present invention is to provide an image decoding device, an image decoding method, and a program that can expect improvement in prediction performance by blending an MC sample, an overlapped block motion compensation (OBMC) sample, and an intra prediction sample subjected to luma mapping to generate a prediction sample in a luma component of a current block, that is, by aligning signal spaces of three prediction samples in a luma-mapped space and then generating a final prediction sample, in a case where all of a geometric partitioning mode (GPM), OBMC, and luma mapping with chroma scaling (LMCS) are valid for the current block, and the GPM includes inter prediction and intra prediction.

The first aspect of the present invention is summarized as an image decoding device including a circuit, wherein the circuit: generates a motion compensation sample for a current block; generates an overlapped block motion compensation sample for the current block; performs luma mapping on luma components of the motion compensation sample and the overlapped block motion compensation sample for the current block; generates an intra prediction sample for the current block; blends the motion compensation sample, the overlapped block motion compensation sample, and the intra prediction sample for the current block; and blends, in a case where all of a geometric partitioning mode, overlapped block motion compensation, and luma mapping with chroma scaling are valid for the current block, and the geometric partitioning mode includes inter prediction and intra prediction, luma-mapped luma components of the motion compensation sample, the overlapped block motion compensation sample, and the intra prediction sample to generate a prediction sample for a luma component of the current block.

The second aspect of the present invention is summarized as an image decoding device including a circuit, wherein the circuit: generate a motion compensation sample for a current block; generates an intra prediction sample for the current block; performs inverse chroma scaling on a chroma component of a prediction residual sample for the current block; blends the motion compensation sample and the intra prediction sample for the current block; and independently applies inverse chroma scaling to each of partitioned areas in a geometric partitioning mode in a case where the geometric partitioning mode and luma mapping with chroma scaling are valid for the current block.

The third aspect of the present invention is summarized as an image decoding method including: generating a motion compensation sample for a current block; generating an overlapped block motion compensation sample for the current block; performing luma mapping on luma components of the motion compensation sample and the overlapped block motion compensation sample for the current block; generating an intra prediction sample for the current block; and blending the motion compensation sample, the overlapped block motion compensation sample, and the intra prediction sample for the current block, wherein in the blending, in a case where all of a geometric partitioning mode, overlapped block motion compensation, and luma mapping with chroma scaling are valid for the current block, and the geometric partitioning mode includes inter prediction and intra prediction, luma-mapped luma components of the motion compensation sample, the overlapped block motion compensation sample, and the intra prediction sample are blended to generate a prediction sample for a luma component of the current block.

The fourth aspect of the present invention is summarized as a program stored on a non-transitory computer-readable medium for causing a computer to function as an image decoding device including a circuit, wherein the circuit: generates a motion compensation sample for a current block; generates an overlapped block motion compensation sample for the current block; performs luma mapping on luma components of the motion compensation sample and the overlapped block motion compensation sample for the current block; generates an intra prediction sample for the current block; blends the motion compensation sample, the overlapped block motion compensation sample, and the intra prediction sample for the current block; and blends, in a case where all of a geometric partitioning mode, overlapped block motion compensation, and luma mapping with chroma scaling are valid for the current block, and the geometric partitioning mode includes inter prediction and intra prediction, luma-mapped luma components of the motion compensation sample, the overlapped block motion compensation sample, and the intra prediction sample to generate a prediction sample for a luma component of the current block.

According to the present invention, it is possible to provide the image decoding device, the image decoding method, and the program that can expect improvement in prediction performance by blending an MC sample, an OBMC sample, and an intra prediction sample subjected to luma mapping to generate a prediction sample in a luma component of a current block, that is, by aligning signal spaces of three prediction samples in a luma-mapped space and then generating a final prediction sample, in a case where all of the GPM, the OBMC, and the LMCS are valid for the current block, and the GPM includes inter prediction and intra prediction.

BRIEF DESCRIPTION OF THE DRAWINGS

FIG. 8 is a diagram illustrating a method for constructing a merge candidate list disclosed in Non Patent Literature 1.

FIG. 9A is a diagram illustrating an example of a rectangular block to be decoded that is motion-compensated by overlapped block motion compensation (OBMC) disclosed in Non Patent Literature 2.

FIG. 9B is a diagram illustrating an example of the rectangular block to be decoded that is motion-compensated by the OBMC disclosed in Non Patent Literature 2.

FIG. 14 is a diagram illustrating an example of angleIdx that defines an angle of the partition line of the GPM.

FIG. 15 is a diagram illustrating an example of disLut.

FIG. 17 is a diagram illustrating an example of a table in which reference areas of the partitioned areas A/B are set based on an angle of a partition line L of the GPM.

FIG. 18 is a diagram for describing an example of a method for restricting a luma component of a reconstruction sample used for calculation of a scaling coefficient.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
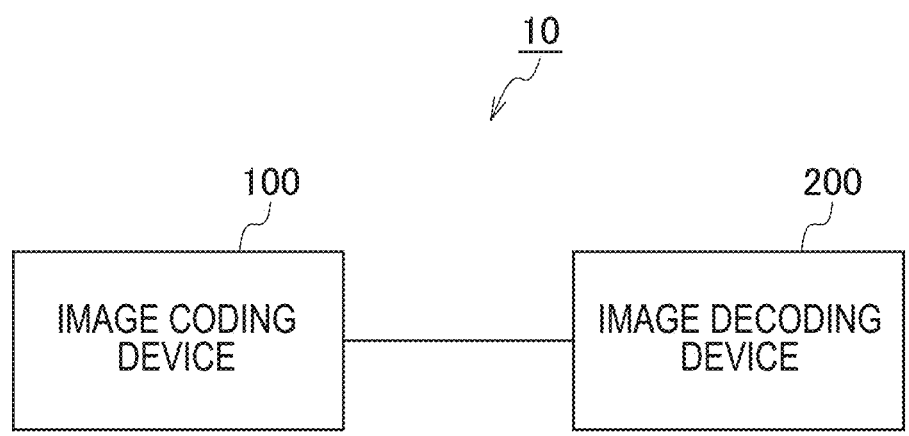
FIG. 1 is a diagram illustrating an example of a configuration of an image processing system 1 according to an embodiment.

Hereinafter, an image processing system 10 according to a first embodiment of the present invention will be described with reference to FIGS. 1 to 16. FIG. 1 is a diagram illustrating the image processing system 10 according to the present embodiment.

(Image Processing System 10)

As illustrated in FIG. 1, the image processing system 10 according to the present embodiment includes an image coding device 100 and an image decoding device 200.

The image coding device 100 is configured to generate coded data by coding an input image signal (picture). The image decoding device 200 is configured to generate an output image signal by decoding the coded data.

The coded data may be transmitted from the image coding device 100 to the image decoding device 200 via a transmission path. The coded data may be stored in a storage medium and then provided from the image coding device 100 to the image decoding device 200.

(Image Coding Device 100)

Figure 2:
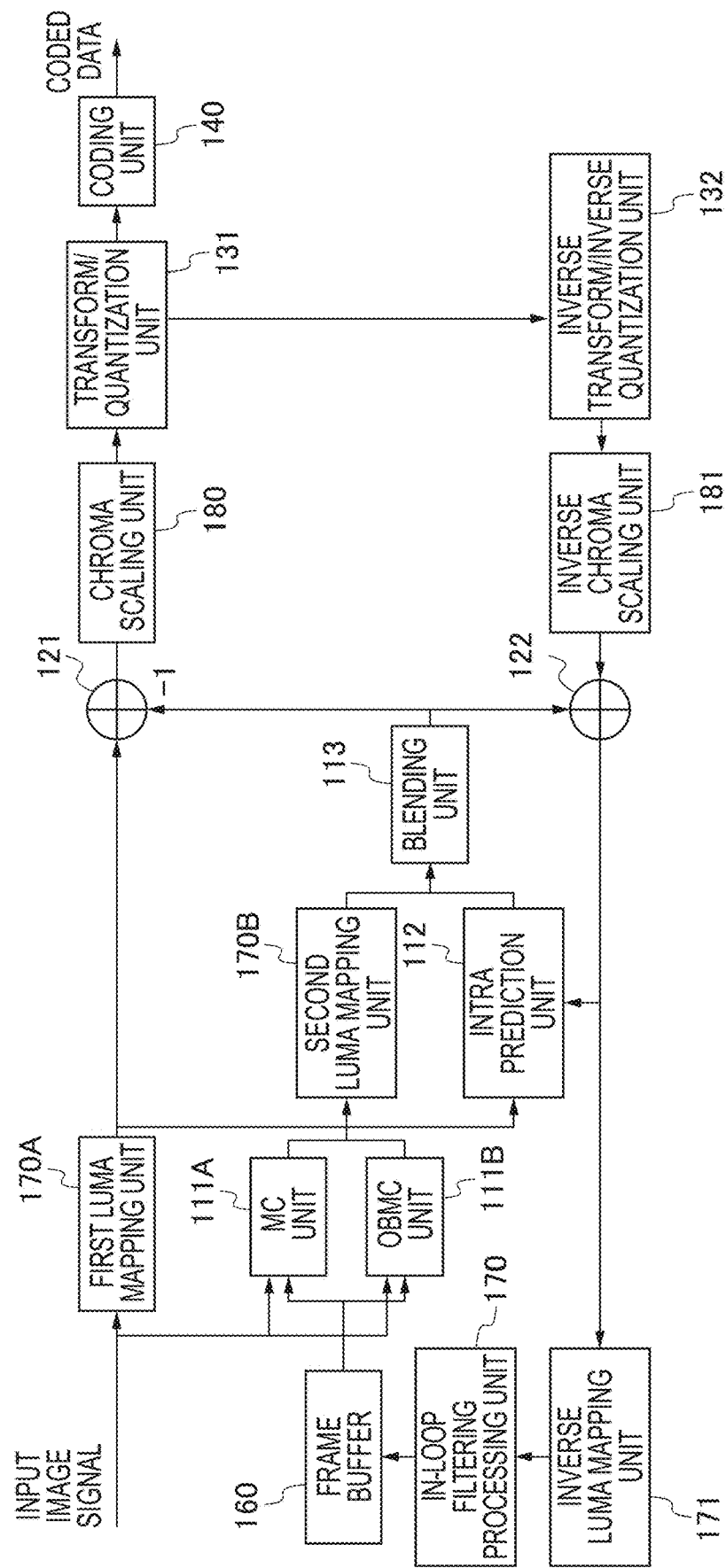
FIG. 2 is a diagram illustrating an example of functional blocks of an image encoding device 100 according to an embodiment.

Hereinafter, the image coding device 100 according to the present embodiment will be described with reference to FIG. 2. FIG. 2 is a diagram illustrating an example of functional blocks of the image coding device 100 according to the present embodiment.

As illustrated in FIG. 2, the image encoding device 100 includes a motion compensation (MC) unit 111A, an overlapped block motion compensation (OBMC) unit 111B, an intra prediction unit 112, a blending unit 113, a subtractor 121, an adder 122, a transform/quantization unit 131, an inverse transform/inverse quantization unit 132, an encoding unit 140, a frame buffer 160, a first luma mapping unit 170A, a second luma mapping unit 170B, an in-loop filtering processing unit 170, an inverse luma mapping unit 171, a chroma scaling unit 180, and an inverse chroma scaling unit 181.

The MC unit 111A is configured to generate an MC sample signal for a current block by motion compensation (MC). Here, the motion compensation is also referred to as inter-frame prediction or inter prediction.

Specifically, the MC unit 111A is configured to specify a reference block included in a reference frame by comparing a frame to be coded (current frame) with the reference frame stored in the frame buffer 160, and determine a motion vector (MV) for the specified reference block. Here, the reference frame is a frame different from the current frame.

The MC prediction unit 111A is configured to generate the MC sample signal (hereinafter, referred to as an MC sample) included in the block to be coded (hereinafter, referred to as the current block) for each current block based on the reference block and the motion vector.

Further, the MC unit 111A is configured to output the MC sample to the second luma mapping unit 170B.

Furthermore, although not illustrated in FIG. 2, the MC unit 111A is configured to output information regarding control of the MC (specifically, information such as an inter prediction mode, the motion vector, a reference frame list, or a reference frame number) to the encoding unit 140.

The OBMC unit 111B is configured to generate an OBMC sample signal (hereinafter, referred to as an OBMC sample) for the current block by overlapped block motion compensation (OBMC), which is a type of inter prediction.

Specifically, the OBMC unit 111B is configured to generate an MC sample signal (hereinafter, referred to as the OBMC sample) for a predetermined sample area overlapping in a current block direction from a boundary between the current block and a block adjacent to the current block (hereinafter, referred to as an adjacent block) based on the reference block and the motion vector for the adjacent block instead of the current block in a procedure similar to that of the MC unit 111A.

Further, the OBMC unit 111B is configured to output the OBMC sample to the second luma mapping unit 170B.

Furthermore, although not illustrated in FIG. 2, the OBMC unit 111B is configured to output information regarding control of the OBMC (specifically, information such as the motion vector, the reference frame list, or the reference frame number) to the encoding unit 140.

The intra prediction unit 112 is configured to generate an intra prediction sample signal (hereinafter, referred to as an intra prediction sample) for the current block by intra prediction (intra-frame prediction).

Specifically, the intra prediction unit 112 is configured to specify the reference block included in the current frame, and generate the intra prediction sample for each current block based on the specified reference block.

Here, the reference block is a block referred to for the current block. For example, the reference block is a block adjacent to the current block.

Furthermore, the intra prediction unit 112 is configured to output the intra prediction sample to the blending unit 113.

Furthermore, although not illustrated in FIG. 2, the intra prediction unit 112 is configured to output information regarding control of the intra prediction (specifically, information such as an intra prediction mode) to the encoding unit 140.

The first luma mapping unit 170A is configured to divide, in a case where luma mapping with chroma scaling (LMCS) disclosed in Non Patent Literature 1 is valid for the current block, a maximum value and a minimum value of sample values of luma components in an input image signal into 16 equal parts in units of the current blocks, and further transform (hereinafter, referred to as luma mapping) a value of the input image signal included in each section by using a pre-designed piecewise linear model.

Note that, as for a luma mapping method using the piecewise linear model, a method similar to that of Non Patent Literature 1 can be applied in the present embodiment, and thus a detailed description thereof is omitted.

The first luma mapping unit 170A is configured to output the value (hereinafter, referred to as an input sample) of the input image signal of the luma-mapped current block to the subtractor 121 and the intra prediction unit 112 in the subsequent stage.

The first luma mapping unit 170A is configured to output, in a case where the LMCS is invalid for the current block, the input sample of the luma component not subjected to the luma mapping to the subtractor 121 and the intra prediction unit 112 in the subsequent stage without applying the above-described luma mapping to the luma component of the input sample.

Further, the first luma mapping unit 170A is configured to output an input sample of a chroma component not subjected to the luma mapping to the subtractor 121 and the intra prediction unit 112 in the subsequent stage without applying the above-described luma mapping processing to the chroma component of the input sample regardless of whether the LMCS is valid or invalid for the current block.

The second luma mapping unit 170B is configured to perform, in a case where the LMCS is valid for the current block, the luma mapping on the luma components of the MC sample output from the MC unit 111A and the OBMC sample output from the OBMC unit 111B by a method similar to that of the first luma mapping unit 170A described above.

Furthermore, the second luma mapping unit 170B is configured to output each of the luma-mapped MC sample and OBMC sample to the blending unit 113 in the subsequent stage.

Note that the second luma mapping unit 170B is configured to output, in a case where the LMCS is invalid for the current block, the MC sample and the OBMC sample of the luma components not subjected to the above-described luma mapping to the blending unit 113 in the subsequent stage without applying the luma mapping to the luma components of the MC sample and the OBMC sample.

Further, the second luma mapping unit 170B is configured to output the MC sample and the OBMC sample of the chroma components not subjected to the luma mapping to the blending unit 113 in the subsequent stage without applying the above-described luma mapping processing to the chroma components of the MC sample and the OBMC sample regardless of whether the LMCS is valid or invalid for the current block.

The blending unit 113 is configured to perform weighted averaging (blending) of the MC sample and the OBMC sample from the second luma mapping unit 170B and the intra prediction sample from the intra prediction unit 112 by using a weighting factor set in advance, and output a blended prediction signal (prediction sample) to the subtractor 121 and the adder 122. Here, details of a weighting factor and a weighted averaging method will be described later.

The subtractor 121 is configured to output, to the chroma scaling unit 180, a difference obtained by subtracting the prediction sample from the blending unit 113 from the input sample, that is, a prediction residual signal (prediction residual sample).

The chroma scaling unit 180 is configured to convert (hereinafter, referred to as chroma scaling), in a case where the LMCS is valid for the current block, a sample value of a chroma component in the prediction residual sample based on a chroma scaling coefficient calculated using an average value of decoded reconstruction samples adjacent to the current block. Details of a chroma scaling method will be described later.

Further, the chroma scaling unit 180 is configured to output the prediction residual sample of the current block subjected to the chroma scaling to the transform/quantization unit 131 in the subsequent stage.

Further, the chroma scaling unit 180 is configured to output, in a case where the LMCS is invalid for the current block, the prediction residual sample not subjected to the above-described chroma scaling to the subtractor 121 and the intra prediction unit 112 in the subsequent stage without applying the chroma scaling to the chroma component of the prediction residual sample.

Further, the chroma scaling unit 180 is configured to output the luma component of the prediction residual sample not subjected to the above-described chroma scaling to the subtractor 121 and the intra prediction unit 112 in the subsequent stage without applying the chroma scaling to the luma component of the prediction residual sample regardless of whether the LMCS is valid or invalid for the current block.

The adder 122 is configured to add the prediction sample output from the blending unit 113 to the prediction residual sample output from the inverse chroma scaling unit 181 to generate an unfiltered decoded signal (hereinafter, referred to as an unfiltered reconstruction signal), and output the unfiltered reconstruction signal to the intra prediction unit 112 and the inverse luma mapping unit 171.

Here, the unfiltered reconstructed sample constitutes the reference block used by the intra prediction unit 112.

The transform/quantization unit 131 is configured to perform transform processing for the prediction residual signal and acquire a coefficient level value. Furthermore, the transform/quantization unit 131 may be configured to perform quantization of the coefficient level value.

Here, the transform processing is processing of transforming the prediction residual signal into a frequency component signal. As such transform processing, a base pattern (transformation matrix) corresponding to discrete cosine transform (hereinafter, referred to as DCT) may be used, or a base pattern (transformation matrix) corresponding to discrete sine transform (hereinafter, referred to as DST) may be used.

Furthermore, as the transform processing, multiple transform selection (MTS) that enables selection of a transform kernel suitable for deviation of a coefficient of the prediction residual signal from a plurality of transform kernels disclosed in Non Patent Literature 1 for each of the horizontal and vertical directions, or low frequency non-separable transform (LFNST) that improves the coding performance by further concentrating a transform coefficient after primary transform in a low frequency area may be used.

The inverse transform/inverse quantization unit 132 is configured to perform inverse transform processing for the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The encoding unit 140 is configured to code the coefficient level value output from the transform/quantization unit 131 and output coded data.

Here, for example, the coding is entropy coding in which codes of different lengths are assigned based on a probability of occurrence of the coefficient level value.

Furthermore, the encoding unit 140 is configured to code control data used in decoding processing in addition to the coefficient level value.

Here, the control data may include information (flag or index) regarding a block size such as a coding block size, a prediction block size, and a transform block size.

Furthermore, the control data may include information (flag or index) necessary for control of inverse transform/inverse quantization processing in an inverse transform/inverse quantization unit 220, MC sample generation processing in an MC unit 241A, OBMC sample generation processing in an OBMC unit 241B, intra prediction sample generation processing in an intra prediction unit 242, final prediction sample generation processing in a blending unit 243, filtering processing in an in-loop filtering processing unit 250, luma mapping processing in a luma mapping unit 270, inverse luma mapping processing in an inverse luma mapping unit 271, inverse chroma scaling processing in an inverse chroma scaling unit 281, and the like in the image decoding device 200 described later.

Note that, in Non Patent Literature 1, these pieces of control data are referred to as syntaxes, and definitions thereof are referred to as semantics.

Furthermore, the control data may include header information such as a sequence parameter set (SPS), a picture parameter set (PPS), a picture header (PH), or a slice header (SH) to be described later.

The inverse chroma scaling unit 181 is configured to perform, in a case where the LMCS is valid for the current block, inverse chroma scaling on the chroma component of the prediction residual sample output from an inverse transform/inverse quantization unit 131.

Here, the inverse chroma scaling is performed by a reverse procedure to the chroma scaling for the chroma component in the prediction residual sample of the current block in the chroma scaling unit 180 described above.

Furthermore, the inverse chroma scaling unit 181 is configured to output the prediction residual sample of the current block subjected to the inverse chroma scaling to the adder 122 in the subsequent stage.

Furthermore, the inverse chroma scaling unit 181 is configured to output, in a case where the LMCS is invalid for the current block, the prediction residual sample not subjected to the above-described inverse chroma scaling to the adder 122 in the subsequent stage without applying the inverse chroma scaling to the chroma component of the prediction residual sample.

Furthermore, the inverse chroma scaling unit 181 is configured to output the prediction residual sample not subjected to the above-described inverse chroma scaling to the adder 122 in the subsequent stage without applying the inverse chroma scaling to the luma component of the prediction residual sample, regardless of whether the LMCS is valid or invalid for the current block.

The inverse luma mapping unit 171 is configured to perform, in a case where the LMCS is valid for the current block, inverse luma mapping on a luma component of the unfiltered reconstruction sample output from the adder 122.

Here, the inverse luma mapping is performed by a reverse procedure to the luma mapping for the luma component of the prediction sample in the current block in the first luma mapping unit 170A or the first luma mapping unit 170B described above.

Furthermore, the inverse luma mapping unit 171 is configured to output the unfiltered reconstruction sample of the inverse-luma-mapped current block to the in-loop filtering unit 170 in the subsequent stage.

Furthermore, the inverse luma mapping unit 171 is configured to output, in a case where the LMCS is invalid for the current block, the luma component of the prediction residual sample not subjected to the above-described inverse luma mapping to the in-loop filtering unit 170 in the subsequent stage without applying the inverse luma mapping to the luma component of the unfiltered reconstruction sample.

Furthermore, the inverse luma mapping unit 171 is configured to output a chroma component of the unfiltered reconstruction sample not subjected to the above-described inverse luma mapping to the in-loop filtering unit 170 without applying the inverse luma mapping to the chroma component of the unfiltered reconstruction sample regardless of whether the LMCS is valid or invalid for the current block.

The in-loop filtering processing unit 170 is configured to execute filtering processing on the unfiltered reconstruction signal output from the inverse luma mapping unit 271 and output a filtered decoded signal to the frame buffer 160.

Here, for example, the filtering processing is deblocking filtering processing of reducing distortion occurring at a boundary area of a block (a coding block, a prediction block, or a transform block), or adaptive loop filtering processing of switching a filter based on a filter coefficient or filter selection information transmitted from the image encoding device 100, a local property of a design of an image, or the like.

The frame buffer 160 is configured to accumulate the filtered decoded signal (hereinafter, referred to as the reference frame) input from the in-loop filtering processing unit 170.

Furthermore, the frame buffer 160 is configured to output the accumulated reference frame as the reference frame used in the MC unit 111A or the OBMC unit 111B.

(Image Decoding Device 200)

Figure 3:
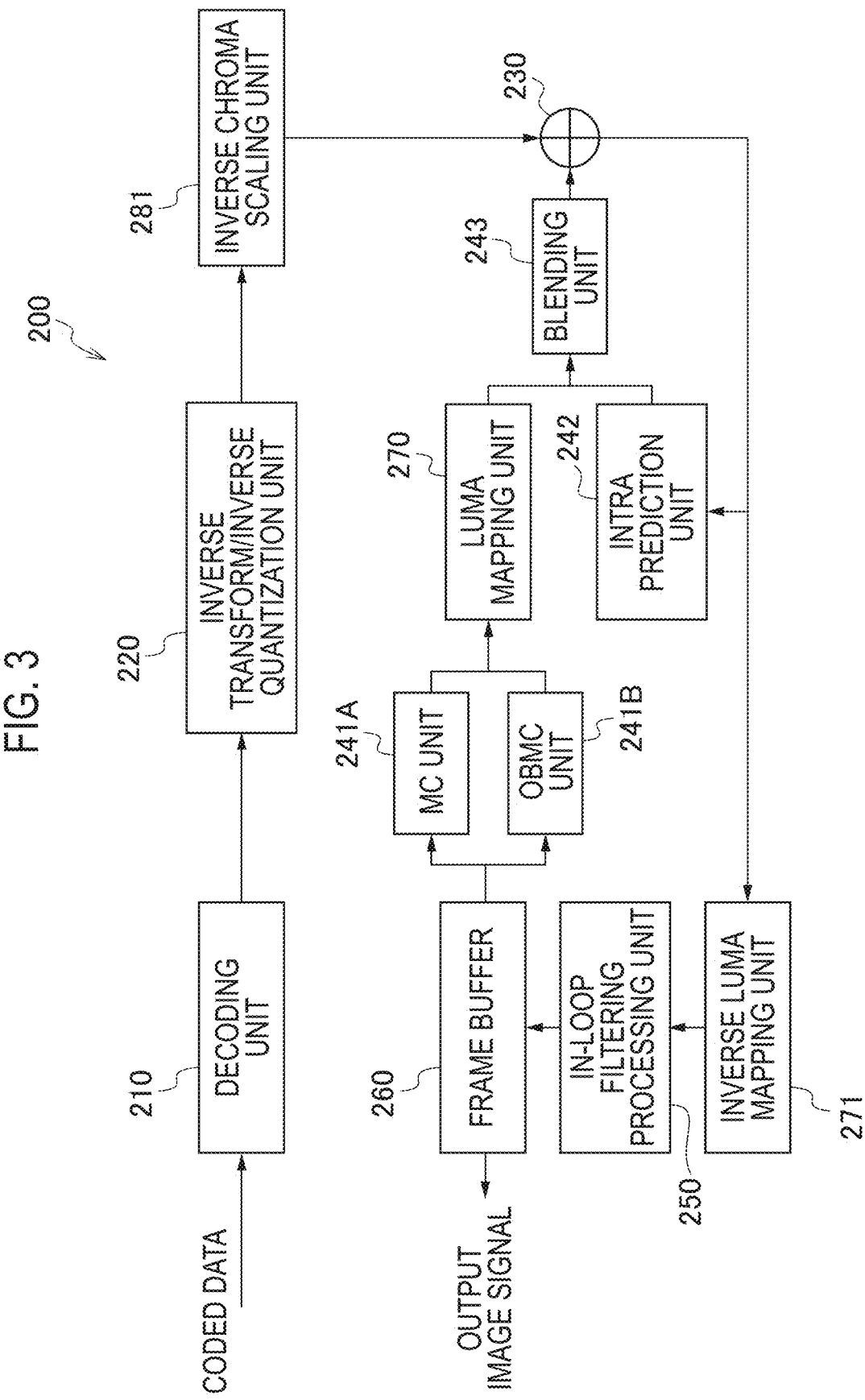
FIG. 3 is a diagram illustrating an example of functional blocks of an image decoding device 200 according to an embodiment.

Hereinafter, the image decoding device 200 according to the present embodiment will be described with reference to FIG. 3. FIG. 3 is a diagram illustrating an example of functional blocks of the image decoding device 200 according to the present embodiment.

As illustrated in FIG. 3, the image decoding device 200 includes a decoding unit 210, the inverse transform/inverse quantization unit 220, the inverse chroma scaling unit 281, an adder 230, the MC unit 241A, the OBMC unit 241B, the luma mapping unit 270, the intra prediction unit 242, the blending unit 243, the inverse luma mapping unit 271, the in-loop filtering processing unit 250, and a frame buffer 260.

The decoding unit 210 is configured to decode the coded data generated by the image encoding device 100 and decode the coefficient level value.

Here, the decoding is, for example, entropy decoding performed in a reverse procedure to the entropy coding performed by the encoding unit 140.

Furthermore, the decoding unit 210 may be configured to acquire control data by decoding processing for the coded data.

Here, the control data may include information regarding a block size of the above-described decoding block (synonymous with the block to be coded in the image encoding device 100 described above) (hereinafter, collectively referred to as the current block).

Furthermore, as described above, the control data may include information (flag or index) necessary for control of the inverse transform/inverse quantization processing in the inverse transform/inverse quantization unit 220, the MC sample generation processing in the MC unit 241A, the OBMC sample generation processing in the OBMC unit 241B, the intra prediction sample generation processing in the intra prediction unit 242, the final prediction sample generation processing in the blending unit 243, the filtering processing in the in-loop filtering processing unit 250, the luma mapping processing in the luma mapping unit 270, the inverse luma mapping processing in the inverse luma mapping unit 271, the inverse chroma scaling processing in the inverse chroma scaling unit 281, and the like in the image decoding device 200.

Furthermore, the control data may include header information such as a sequence parameter set (SPS), a picture parameter set (PPS), a picture header (PH), or a slice header (SH) described above.

The inverse transform/inverse quantization unit 220 is configured to perform inverse transform processing for the coefficient level value output from the decoding unit 210. Here, the inverse transform/inverse quantization unit 220 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

Similarly to the inverse chroma scaling unit 181, the inverse chroma scaling unit 281 is configured to perform, in a case where the LMCS is valid for the current block, inverse chroma scaling on a chroma component of a prediction residual sample output from the inverse transform/inverse quantization unit 220.

Here, the inverse chroma scaling is performed by a reverse procedure to the chroma scaling for the chroma component in the prediction residual sample of the current block in the chroma scaling unit 180 described above.

Furthermore, the inverse chroma scaling unit 281 is configured to output the prediction residual sample of the current block subjected to the inverse chroma scaling to the adder 230 in the subsequent stage.

Furthermore, the inverse chroma scaling unit 281 is configured to output, in a case where the LMCS is invalid for the current block, the chroma component of the prediction residual sample not subjected to the above-described inverse chroma scaling to the adder 230 in the subsequent stage without applying the inverse chroma scaling to the chroma component of the prediction residual sample.

Furthermore, the inverse chroma scaling unit 281 is configured to output a luma component of the prediction residual sample not subjected to the above-described inverse chroma scaling to the adder 230 in the subsequent stage without applying the inverse chroma scaling to the luma component of the prediction residual sample regardless of whether or not the LMCS is valid or invalid for the current block.

Similarly to the adder 222, the adder 230 is configured to add a prediction sample output from the blending unit 243 to the prediction residual sample output from the inverse chroma scaling unit 281 to generate an unfiltered decoded signal (hereinafter, referred to as an unfiltered reconstruction signal), and output the unfiltered reconstruction sample to the intra prediction unit 42 and the inverse luma mapping unit 271.

Here, the unfiltered decoded signal constitutes the reference block used by the intra prediction unit 112.

Similarly to the inverse luma mapping unit 171, the inverse luma mapping unit 271 is configured to perform, in a case where the LMCS is valid for the current block, inverse luma mapping on a luma component of the unfiltered reconstruction sample output from the adder 230.

Here, the inverse luma mapping is performed by a reverse procedure to the luma mapping for the luma component of the prediction sample in the current block in the first luma mapping unit 170A or the second luma mapping unit 170B described above.

Furthermore, the inverse luma mapping unit 271 is configured to output the unfiltered reconstruction sample of the inverse-luma-mapped current block to the in-loop filtering unit 280 in the subsequent stage.

Furthermore, the inverse luma mapping unit 271 is configured to output, in a case where the LMCS is invalid for the current block, the luma component of the prediction residual sample not subjected to the above-described inverse luma mapping to the in-loop filtering unit 280 in the subsequent stage without applying the inverse luma mapping to the luma component of the unfiltered reconstruction sample.

Furthermore, the inverse luma mapping unit 271 is configured to output the unfiltered reconstruction sample not subjected to the above-described inverse luma mapping to the in-loop filtering unit 280 without applying the inverse luma mapping to a chroma component of the unfiltered reconstruction sample regardless of whether the LMCS is valid or invalid for the current block.

Similarly to the in-loop filtering processing unit 150, the in-loop filtering processing unit 250 is configured to execute filtering processing on the unfiltered decoded signal output from the adder 230 and output a filtered decoded signal to the frame buffer 260.

Here, for example, the filtering processing is deblocking filtering processing of reducing distortion occurring at a boundary area of a block (a coding block, a prediction block, a transform block, or a sub-block obtained by dividing each of the coding block, the prediction block, and the transform block), or adaptive loop filtering processing of switching a filter based on a filter coefficient or filter selection information transmitted from the image encoding device 100, a local property of a design of an image, or the like.

Similarly to the frame buffer 160, the frame buffer 260 is configured to accumulate reference frames used by the inter prediction unit 241.

Here, the filtered decoded signal constitutes the reference frame used by the inter prediction unit 241.

Similarly to the MC unit 111A, the MC unit 241A is configured to generate an MC sample for the current block by motion compensation (MC). Here, the motion compensation is also referred to as inter-frame prediction or inter prediction.

Specifically, the MC unit 241A is configured to specify a reference block included in a reference frame by comparing a frame to be decoded (current frame) with the reference frame stored in the frame buffer 260, and determine an MV for the specified reference block. Here, the reference frame is a frame different from the current frame.

Furthermore, the MC unit 241A is configured to generate an MC sample included in the current block for each current block based on the reference block and the motion vector.

Further, the MC unit 241A is configured to output the MC sample to the luma mapping unit 270.

The OBMC unit 241B is configured to generate an OBMC sample for the current block by the OBMC.

Specifically, the OBMC unit 241B is configured to generate an MC sample (OBMC sample) for a predetermined sample area overlapping in a current block direction from a boundary between the current block and an adjacent block by a procedure similar to that of the OBMC unit 111B.

Further, the OBMC unit 241B is configured to output the OBMC sample to the luma mapping unit 270.

Similarly to the second luma mapping unit 170B, the luma mapping unit 270 is configured to perform, in a case where the LMCS is valid for the current block, the luma mapping on the luma component of each of the MC sample output from the MC unit 241A and the OBMC sample output from the OBMC unit 241B by a method similar to that of the first luma mapping unit 170A and the second luma mapping unit 170B described above.

Furthermore, the luma mapping unit 270 is configured to output each of the MC sample and the OBMC sample subjected to the luma mapping to the blending unit 243 in the subsequent stage.

Note that the luma mapping unit 270 is configured to output, in a case where the LMCS is invalid for the current block, the MC sample and the OBMC sample of the luma components not subjected to the above-described luma mapping to the blending unit 243 in the subsequent stage without applying the above-described luma mapping to the luma components of the MC sample and the OBMC sample.

Furthermore, the luma mapping unit 270 is configured to output the MC sample and the OBMC sample of the chroma components not subjected to the above-described luma mapping to the blending unit 243 in the subsequent stage without applying the luma mapping processing to the chroma components of the MC sample and the OBMC sample regardless of whether the LMCS is valid or invalid for the current block.

Similarly to the intra prediction unit 112, the intra prediction unit 242 is configured to generate an intra prediction sample for the current block by intra prediction.

Specifically, the intra prediction unit 242 is configured to specify the reference block included in the current frame, and generate the prediction signal for each current block based on the specified reference block. Here, the reference block is a block referred to for the current block. For example, the reference block is a block adjacent to the current block.

Furthermore, the intra prediction unit 242 is configured to output the intra prediction sample to the blending unit 243.

Similarly to the blending unit 113, the blending unit 243 is configured to perform weighted averaging (blending) of the MC sample and the OBMC sample from the luma mapping unit 270 and the intra prediction sample from the intra prediction unit 242 by using a weighting factor set in advance, and output a blended prediction sample to the adder 230. Here, details of a weighting factor and a weighted averaging method will be described later.

(Geometric Partitioning Mode)

Hereinafter, a geometric partitioning mode (GPM) disclosed in Non Patent Literature 1 related to the decoding unit 210, the MC prediction unit 241A, the intra prediction unit 242, and the blending unit 243 will be described with reference to FIG. 4.

Figure 4:
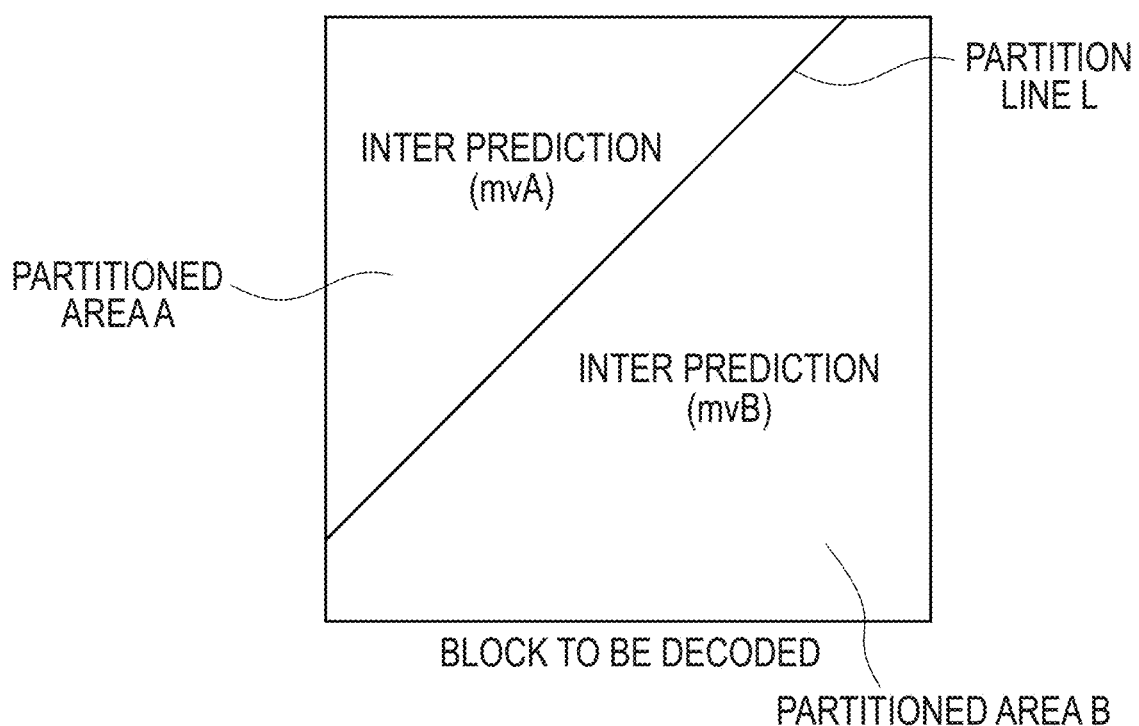
FIG. 4 is a diagram illustrating an example of a case where a rectangular block to be decoded is partitioned into two partitioned areas A and B having geometric shapes by a partition line of a geometric partitioning mode according to the geometric partitioning mode disclosed in Non Patent Literature 1.

FIG. 4 illustrates an example of a case where a rectangular block to be decoded is partitioned into two partitioned areas A and B having geometric shapes by a partition line L of the geometric partitioning mode according to the geometric partitioning mode disclosed in Non Patent Literature 1.

Here, 64 patterns of the partition line L of the geometric partitioning mode disclosed in Non Patent Literature 1 are prepared according to the angle and the displacement.

Furthermore, in the GPM according to Non Patent Literature 1, motion compensation (MC) using one different motion vector derived for each of the partitioned area A and the partitioned area B is applied, and an MC sample is generated.

Specifically, in such a GPM, a merge candidate list disclosed in Non Patent Literature 1 is constructed, and motion vector (mvA and mvB) of the partitioned areas A/B and a reference frame are derived based on the merge candidate list and two merge indexes (merge_gpm_idx0 and merge_gpm_idx1) for the partitioned areas A/B transmitted from the image encoding device 100, thereby generating a motion compensation sample. Then, weighted averaging (blending) of the MC samples of the partitioned areas A/B is performed using a preset weighting factor to be described later, and a final prediction sample by the GPM is generated.

(Application of Intra Prediction to GPM)

Hereinafter, application of the intra prediction mode to the geometric partitioning mode (GPM) disclosed in Non Patent Literature 1 related to the decoding unit 210, the MC unit 241A, the intra prediction unit 242, and the blending unit 243 and a first geometric partitioning mode (GPM) according to the present embodiment will be described with reference to FIGS. 5 and 6.

Figure 5:
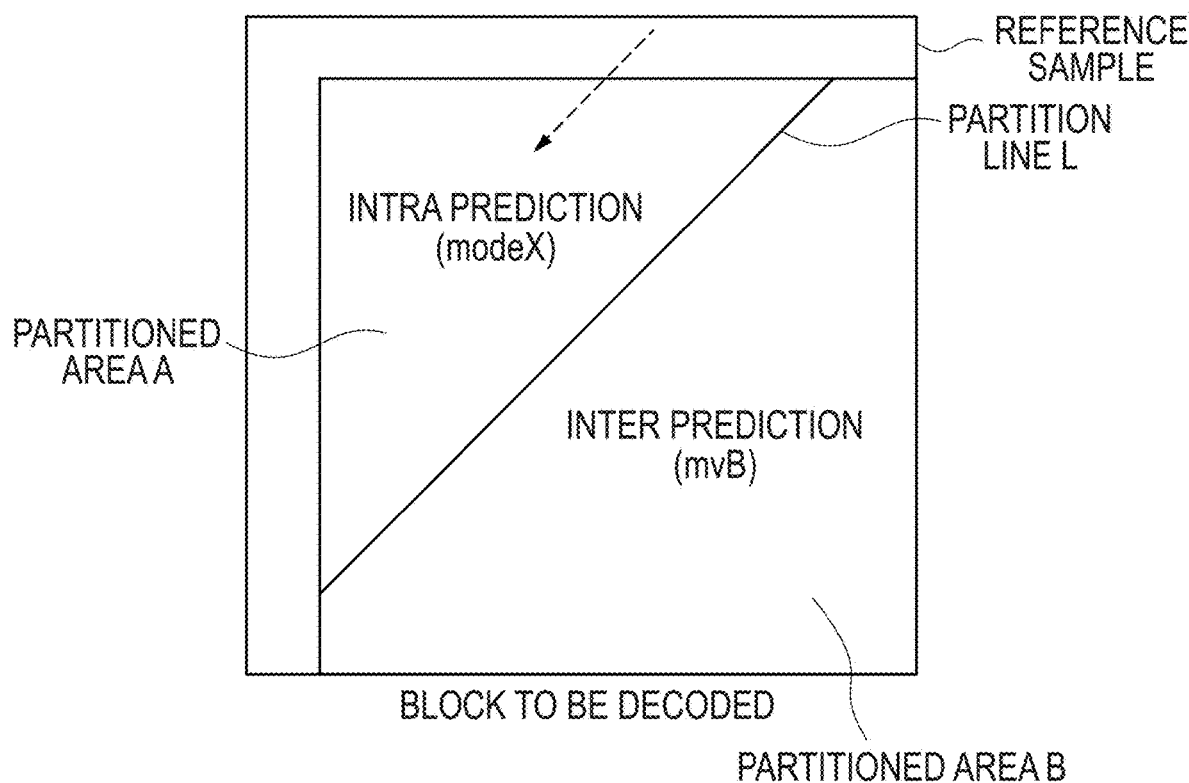
FIG. 5 illustrates an example of application of an intra prediction mode to a geometric partitioning mode (GPM) according to the present embodiment.
Figure 6:
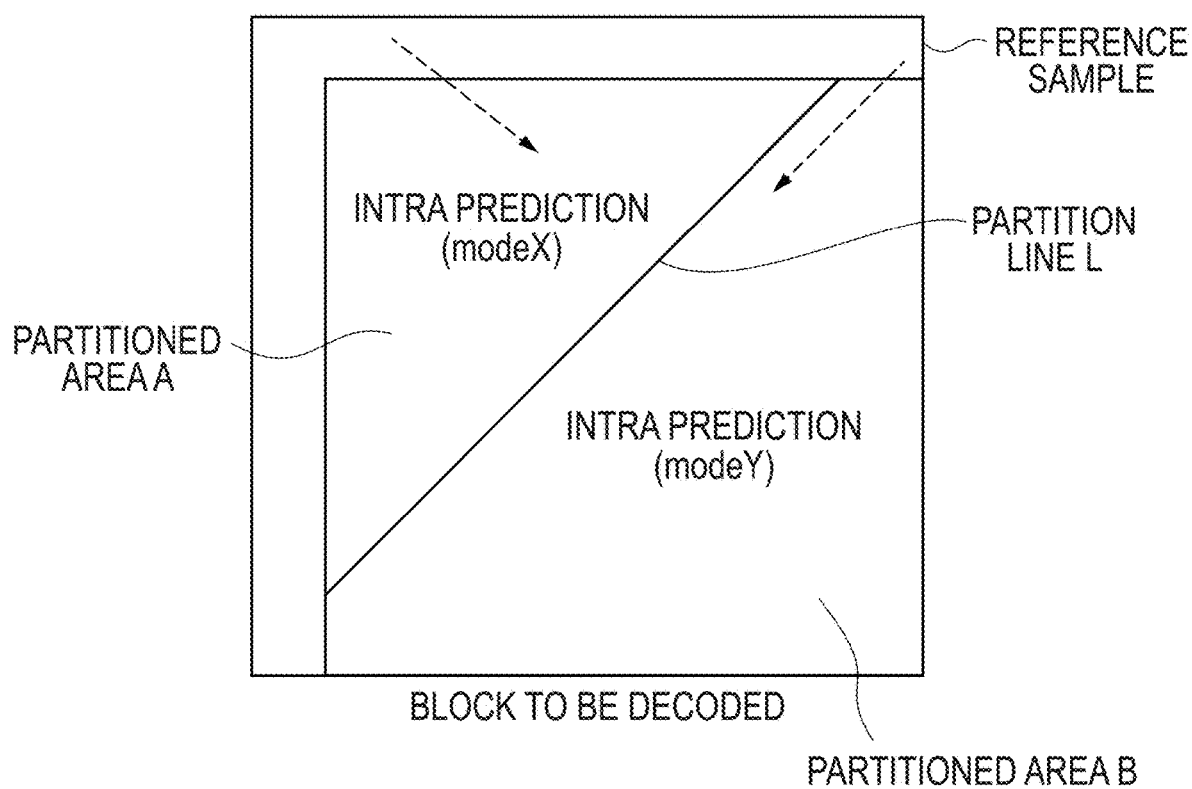
FIG. 6 illustrates the example of the application of the intra prediction mode to the GPM according to the present embodiment.

FIGS. 5 and 6 illustrate an example of application of the intra prediction mode to the GPM according to the present embodiment.

Specifically, FIG. 5 illustrates a configuration example of the GPM according to the present embodiment in a case where intra prediction (modeX) and inter prediction are applied to the partitioned areas A/B, respectively. FIG. 6 illustrates a configuration example of the GPM according to the present embodiment in a case where two different intra predictions (modeX and modeY) are applied to the partitioned areas A/B, respectively.

Here, in the first GPM according to the present embodiment, either the inter prediction or the intra prediction can be applied to each of the partitioned areas A/B. Furthermore, the type of the intra prediction mode applied in the intra prediction is limited based on a partitioning shape (partition line) of the GPM applied to the current block. That is, an applicable intra prediction mode is derived based on the partitioning shape (partition line) of the GPM applied to the current block.

Furthermore, in a second GPM according to the present embodiment, a method for specifying whether or not a GPM to which the intra prediction mode is additionally applied is applicable in a block to be decoded and a prediction mode type in each of the partitioned areas A/B in a case where the GPM is applied is defined.

As a result, the GPM to which the intra prediction mode is additionally applied is appropriately applied to the block to be decoded, and the optimum prediction mode is specified, so that the coding performance can be further improved.

Note that, hereinafter, a GPM including two different inter predictions as illustrated in FIG. 4, the GPM including the intra prediction and the inter prediction as illustrated in FIG. 5, and the GPM including the intra prediction and the intra prediction as illustrated in FIG. 6 will be referred to as an inter/inter-GPM, an intra/inter-GPM, and an intra/intra-GPM, respectively.

Furthermore, improvement in prediction performance can be expected by blending the MC sample by the GPM, the intra prediction sample, and the OBMC sample by the OBMC subjected to luma mapping to generate a prediction sample in the luma component of the current block, that is, by aligning the above-described three signal spaces used for generation of the prediction sample in a luma-mapped space, in a case where all of the GPM, the OBMC, and the LMCS are valid for the current block, and the GPM includes the inter prediction and the intra prediction.

[Intra Prediction Mode Derivation Method and Selection Method in Intra Prediction Unit 242]

Hereinafter, a method for deriving and selecting the intra prediction mode for the intra/inter-GPM and the intra/intra-GPM among patterns of application of the intra prediction to the GPM proposed in the present embodiment in the intra prediction unit 242 will be described.

(Intra Prediction Mode Candidate List)

Figure 7:
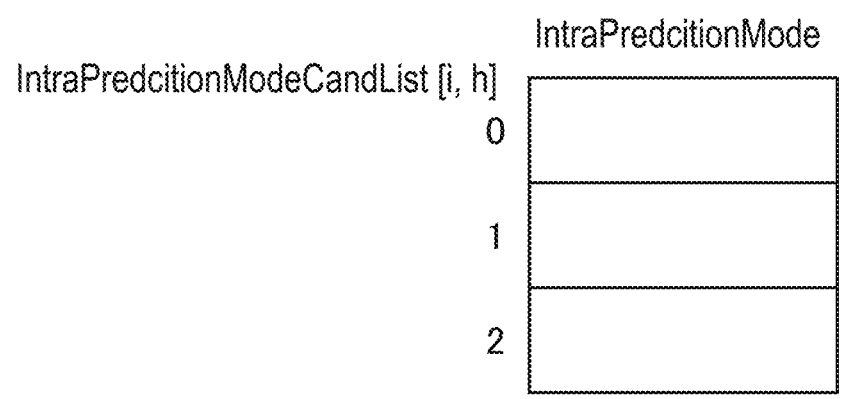
FIG. 7 is a diagram illustrating an example of an intra prediction mode candidate list according to the present embodiment.

Hereinafter, a method for constructing an intra prediction mode candidate list for the GPM in the intra prediction unit 242 according to the present embodiment (hereinafter, referred to as an intra prediction mode candidate list) will be described with reference to FIG. 7. FIG. 7 is a diagram illustrating an example of the intra prediction mode candidate list according to the present embodiment.

In the present embodiment, a list size of the intra prediction mode candidate list may be a fixed value. For example, the list size may be "3", "4", "5", "6" which is the maximum size of the intra prediction mode candidate list for an intra prediction block to which the GPM is not applied disclosed in Non Patent Literature 1, or "22" which is the maximum size of the intra prediction mode candidate list for an intra prediction block to which the GPM is not applied disclosed in Non Patent Literature 3.

Alternatively, the list size of the intra prediction mode candidate list may be a variable value. For example, an index defining the maximum value of the list size is included in control data in units of sequences, pictures, or slices, and the control data is decoded by the decoding unit 210, whereby the maximum value of the list size in units of sequences, pictures, or slices can be specified.

In the intra prediction mode candidate list, a plurality of intra prediction modes derived based on the partitioning shape of the GPM or a reference sample or reference block adjacent to a block to be decoded described below are registered. Details of a method for deriving the intra prediction modes will be described later.

After the derivation of the intra prediction modes (construction of the intra prediction mode candidate list) described above is completed, the intra prediction unit 242 may select any one intra prediction mode in the intra prediction mode candidate list for each of the partitioned areas A/B to be used for generation of the intra prediction sample based on values of two intra prediction mode indexes (intra_gpm_idx0 and intra_gpm_idx1) for the partitioned areas A/B decoded or estimated by the decoding unit 210.

Note that, in a case where the two intra prediction mode indexes have the same value for the intra/intra-GPM, it is the same as the intra prediction to which the GPM is not applied, and thus, the two intra prediction mode indexes necessarily have different values.

Furthermore, the decoding unit 210 may determine whether or not it is necessary to decode an intra prediction mode index for selecting the intra prediction mode to be used for generating the intra prediction sample from the intra prediction mode candidate list according to the total number of applications of intra predictions included in the GPM.

Here, as the above-described modification, the intra prediction unit 242 may select a plurality of intra prediction modes in the intra prediction mode candidate list according to the value of the above-described intra prediction mode index, and generate the intra prediction sample.

As a result, in the image decoding device 200 implemented by hardware, a circuit scale required for generating the intra prediction sample increases, but the intra prediction sample can be generated by a plurality of intra prediction modes, and thus, the intra prediction performance is improved, and as a result, improvement in coding performance can be expected.

In a case where the intra prediction sample is generated (blended) using a plurality of intra prediction modes, the intra prediction sample may be blended by averaging. Alternatively, the intra prediction sample may be blended by performing weighted averaging using a predetermined weight value.

As a method for setting such a weight value, for example, the earlier the intra prediction mode candidate list is registered (a list number is smaller), the larger the weight value may be set.

Alternatively, the later the intra prediction mode candidate list is registered (the list number is large), the smaller the weight value may be set. Since an intra prediction mode having a smaller intra prediction mode candidate list number has a higher improvement rate of the intra prediction performance applied to the GPM, as a result, an effect of improving the coding performance can be expected by setting the weight value in this manner.

(Intra Prediction Mode Derivation Method Based on Partitioning Shape)

In the present embodiment, the intra prediction unit 242 derives the intra prediction mode based on the partitioning shape (partition line) of the GPM and registers the intra prediction mode in the intra prediction mode candidate list described above.

Here, the derived intra prediction mode may be configured to be angular prediction parallel to the partitioning shape (partition line) of the GPM among 65 types of angular predictions prepared for the intra prediction to which the GPM disclosed in Non Patent Literature 1 is not applied (hereinafter, normal intra prediction), for example.

Alternatively, the intra prediction mode derived as a modification may be configured to be angular prediction perpendicular to the partitioning shape (partition line L) of the GPM among the 65 types of angular predictions prepared for the normal intra prediction disclosed in Non Patent Literature 1.

The intra prediction unit 242 may register the derived angular prediction at the beginning of the above-described intra prediction mode candidate list even after completion of derivation of another intra prediction mode to be described later.

In the intra prediction mode derived based on the partitioning shape of the GPM, the intra prediction sample can be generated while reflecting a texture of an edge or the like according to the partitioning shape of the GPM, so that the effect of improving the intra prediction performance can be expected. Therefore, a selection rate of the intra prediction mode for an intra prediction area of the GPM can be expected to be high, and thus, the total code length of the intra prediction mode index that is necessary can be shortened when associated with the minimum list number in the intra prediction mode candidate list, and as a result, the effect of improving the coding performance can be expected.

(Intra Prediction Mode Derivation Method Based on Sample or Block Adjacent to Block to be Decoded)

In the present embodiment, in addition to the above-described derivation of the intra prediction mode based on the partitioning shape, or as a modification, the intra prediction mode may be derived based on a sample or block adjacent to a block to be decoded.

Here, a reference sample or reference block adjacent to a block to be decoded is a reference sample or reference block adjacent to the block to be decoded and for which decoding processing has been completed at the start of decoding processing of the block to be decoded.

(Other Intra Prediction Mode Derivation Method)

In the present embodiment, in addition to the above-described two types of derivations of the intra prediction mode, or as a modification, other intra prediction modes may be derived. Specifically, a DC mode or a planar mode may be derived.

[Motion Information Derivation Method and Selection Method in MC Unit 241A]

Hereinafter, a motion information derivation method and selection method for the intra/inter-GPM and the inter/inter-GPM among the patterns of application of the motion compensation (inter prediction) to the GPM proposed in the present embodiment in the MC unit 241A will be described with reference to FIG. 8.

(Merge Candidate List)

In the present embodiment, the MC unit 241A may derive the motion information from the merge candidate list for the GPM disclosed in Non Patent Literature 1.

Here, the configuration disclosed in Non Patent Literature 1 can also be applied to the present embodiment as a method for constructing the merge candidate list, and thus a detailed description thereof will be omitted.

After the above-described derivation of the motion information (the construction of the merge candidate list) is completed, the MC unit 241A may select motion information in the merge candidate list to be used for generation of the inter prediction sample based on the values of the two merge indexes (merge_gpm_idx0/merge_gpm_idx1) for the partitioned areas A/B decoded or estimated by the decoding unit 210.

Note that the decoding unit 210 may determine whether or not decoding of the merge index for selecting the motion information to be used for generation of the inter prediction sample from the merge candidate list is necessary according to the total number of applications of inter predictions included in the GPM.

Figure 8:
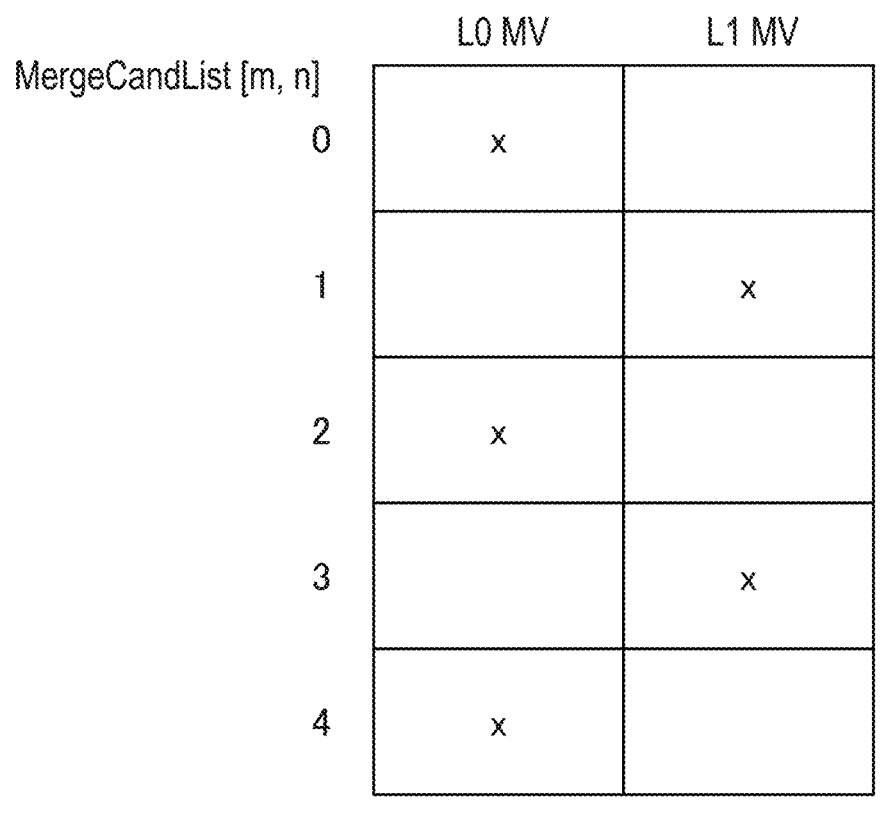

In Non Patent Literature 1, the motion information of the inter prediction for the partitioned areas A/B is derived by the values of the two merge indexes (merge_gpm_idx0/merge_gpm_idx1) decoded or estimated by the decoding unit 210 and the merge candidate list (MergeCandList[m,n]) for the GPM illustrated in FIG. 8.

Here, in order to prevent pieces of motion information derived based on merge_gpm_idx0 and merge_gpm_idx1 from overlapping as much as possible, the list number from which the motion information selected by merge_gpm_idx0 and merge_gpm_idx1 is derived has a nested structure with an even number and an odd number of MergeCandList as illustrated in X of FIG. 8.

Specifically, the following m and n are calculated based on merge_gpm_idx0 and merge_gpm_idx1.

$$m = \text{merge\_gpm\_idx0}[xCb][yCb]$$

$$n = \text{merge\_gpm\_idx1}[xCb][yCb] + ((\text{merge\_gpm\_idx1}[xCb][yCb] >= m)?1:0$$

The motion vector, a reference image index, and a prediction list flag included in the motion information of the partitioned area A are derived as follows based on the value of m calculated in this manner.

First, the value of X is calculated from m&0x01 (determination of whether or not the value of m is an even number) and n&0x01 (determination of whether or not the value of n is an even number). Here, in a case where the calculated X is 0, the value of X is set to (1−X).

Finally, the motion vector mvA of the partitioned area A, a reference image index refIdxA, a prediction list flag preListFlagA, the motion vector mvB of the partitioned area B, a reference image index refIdxB, and a prediction list flag preListFlagB are derived as follows.

$$mvA = mvLXM$$
$$refId \times A = refId \times LXM$$
$$preListFlagA = X$$
$$mvB = mvLXN$$
$$refId \times B = refId \times LXN$$
$$preListFlagB = X$$

Here, M and N are numbers of merge candidates indicated by m and n in the merge candidate list, respectively, that is, $$M = \text{MergeCandList}[m], \text{ and } N = \text{MergeCandList}[n].$$

As a modification, in the present embodiment, a merge candidate list for the GPM disclosed in Non Patent Literature 2 may be used as an alternative to the merge candidate list for the GPM disclosed in Non Patent Literature 1.

Specifically, pruning processing (hereinafter, referred to as merge candidate pruning processing for the GPM) stronger than pruning processing (hereinafter, referred to as merge candidate pruning processing for a normal merge mode) introduced in the merge candidate list for the normal merge mode disclosed in Non Patent Literature 1 is introduced.

Specifically, unlike the pruning processing for the normal merge mode disclosed in Non Patent Literature 1, whether or not the motion information is to be pruned is determined based on whether or not the reference frame included in the motion information completely matches that of Non Patent Literature 1. However, in a case of the motion vector included in the motion information, the determination is made not based on complete matching but based on a threshold based on the block size of the block to be decoded.

Specifically, in a case where the block size of the block to be decoded is less than 64 samples, the threshold is set to ¼ samples. In a case where the block size of the block to be decoded is 64 samples or more and less than 256 samples, the threshold is set to ½ samples. In a case where the block size of the block to be decoded is 256 samples or more, the threshold is set to 1 sample.

A specific flow of the merge candidate pruning processing for the GPM is similar to that of the pruning processing for the normal merge mode, first, whether or not the reference frames completely matches is determined, and in a case where the reference frames completely match, whether or not the motion vectors completely match is determined.

In a case where the reference frames do not completely match, even when the motion vector is less than the threshold, the motion information is not considered to be pruned. In such a case, the motion information that is not in the merge candidate list among comparison targets is added to the merge candidate list as a new merge candidate.

Then, in a case where the reference frames completely match and the motion vector is less than the threshold, the motion information is considered to be pruned. Otherwise, the motion information that is not in the merge candidate list among the comparison targets is added to the merge candidate list as a new merge candidate.

With such a configuration, motion information with a similar motion vector that is not to be pruned in the pruning processing for the normal merge mode is also included in pruning targets, and thus, the similarity of the pieces of motion information derived by the two merge indexes of the GPM can be eliminated, and the improvement of the coding performance can be expected.

In the merge candidate pruning processing for the GPM disclosed in Non Patent Literature 2, in a case where the motion information is bi-prediction (that is, in a case where one motion vector and one reference frame are provided for each of L0 and L1), the motion information is considered to be pruned when the motion information completely matches each of the reference frames L0 and L1 of the merge candidate to be compared.

In the present embodiment, the MC unit 241A may derive the motion information by using the merge candidate list of the GPM to which the merge candidate pruning processing for the GPM is added as an alternative for the normal merge mode.

With such a configuration, the motion information can be derived from the merge candidate list including pieces of motion information having a lower similarity, and thus, the improvement of the coding performance can be expected.

As a further modification, the MC unit 241A may switch one of the merge candidate list for the normal merge mode and the merge candidate list for the GPM is to be used as the merge candidate list used for deriving the motion vector by a flag.

Specifically, for example, a 1-bit flag decoded by the decoding unit 210 is included in the control data, so that the decoding unit 210 decodes or estimates the value of the flag and transmits the value to the MC unit 241A, whereby the switching can be implemented.

With such a configuration, the MC unit 241A can derive the motion information from more various variations, and thus, prediction performance is improved, and as a result, the improvement of the coding performance can be expected.

(Overlapped Block Motion Compensation and Decoder Motion Vector Refinement)

Hereinafter, overlapped block motion compensation (OBMC) disclosed in Non Patent Literature 2 related to the decoding unit 210 and the OBMC unit 241B will be described with reference to FIGS. 9 and 10.

FIG. 9 illustrates two examples of rectangular blocks to be decoded to which the OBMC disclosed in Non Patent Literature 2 is applied.

FIG. 9A illustrates an example in which the OBMC is applied to block boundaries facing an upper side and a left side of a block to be decoded in a case where a motion vector (MV) included in the block to be decoded is uniform for the block to be decoded.

Meanwhile, FIG. 9B illustrates an example in which the OBMC is applied to upper, lower, left, and right block boundaries of each block in a case where the MV of the block to be decoded is not uniform for the block to be decoded, for example, in a case where the block to be decoded has different MVs for each predetermined block size as illustrated in FIG. 9B.

The example illustrated in FIG. 9B occurs, for example, in a case where affine prediction and decoder motion vector refinement (DMVR) disclosed in Non Patent Literature 1 are valid.

Here, the DMVR is a technology of deriving a motion vector by the OBMC unit 241B and then refining the derived motion vector by re-searching in units of 16×16 samples.

In the GPM disclosed in Non Patent Literature 1, the application of the DMVR and BDOF is restricted at the time of inter prediction of each partitioned area, but bi-prediction can be applied to the inter prediction area of the intra/inter-GPM in the present embodiment, and thus, the OBMC unit 241B may apply the DMVR or BODF to the inter prediction area of the intra/inter-GPM.

As a result, the accuracy of the prediction sample value generated by bi-prediction of the inter prediction area of the intra/inter-GPM is improved, so that a further effect for the coding performance can be expected.

Note that, since the same configuration as that of Non Patent Literature 1 can be used in the present embodiment as a method for determining whether or not to apply the DMVR or BODF, a detailed description thereof is omitted.

On the other hand, even in a case where the bi-prediction can be applied to the inter prediction area of the intra/inter-GPM in the present embodiment, the OBMC unit 241B may always restrict (prohibit) the application of the DMVR or BODF.

That is, even in a case where a condition for determining applicability of the DMVR or BODF disclosed in Non Patent Literature 1 described above is satisfied, the application of the DMVR or BODF is restricted for the inter prediction area of the intra/inter-GPM.

Specifically, the restriction can be achieved by adding, to the application condition for the DMVR or BODF disclosed in Non Patent Literature 1, a determination condition based on a flag indicating whether or not the GPM disclosed in Non Patent Literature 1 is applied in the block to be decoded.

As a result, further improvement of the coding performance cannot be expected, but it is possible to avoid an increase in processing amount of the OBMC unit 241B due to re-searching or the like by additional application of the DMVR or BDOF to the inter prediction area of the intra/inter-GPM.

(Method for Controlling Application of Overlapped Block Motion Compensation)

Hereinafter, a method for controlling application of the OBMC by the OBMC unit 241B will be described with reference to FIG. 10. FIG. 10 is a flowchart of the method for controlling application of the OBMC by the OBMC unit 241B.

First, the OBMC unit 241B performs control for each sub-block (hereinafter, referred to as current sub-block) of 4×4 samples, which is an application unit of the OBMC described above, similarly to the processing of determining applicability of the OBMC is applicable disclosed in Non Patent Literature 2.

Figure 10:
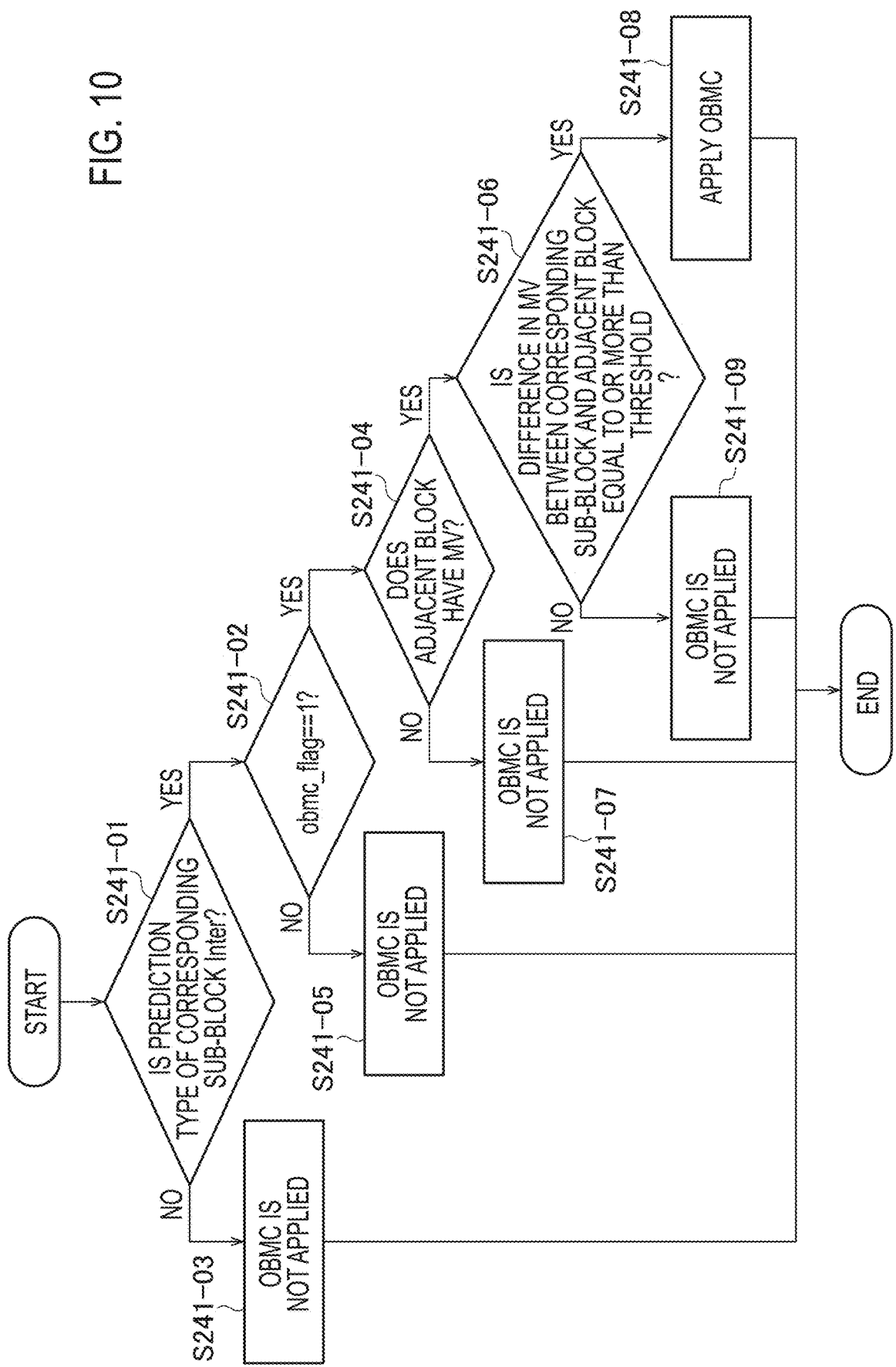
FIG. 10 is a flowchart illustrating an example of an operation of an inter prediction unit 241.

As illustrated in FIG. 10, in step S241-01, the OBMC unit 241B determines whether or not a prediction type of the current sub-block is inter prediction.

In a case where the OBMC unit 241B determines that the condition is satisfied, the operation proceeds to step S241-02, and in a case where the OBMC unit 241B determines that the condition is not satisfied, that is, in a case where the OBMC unit 241B determines that the prediction type of the current sub-block is intra prediction, the operation proceeds to step S241-03.

In step S241-03, the OBMC unit 241B determines not to apply the OBMC in the current sub-block, and the operation ends.

In step S241-02, the OBMC unit 241B determines whether or not obmc_flag of the current sub-block is 1.

In a case where the OBMC unit 241B determines that such a condition is satisfied, the operation proceeds to step S241-04, and in a case where the OBMC unit 241B determines that such a condition is not satisfied, that is, in a case where obmc_flag is determined to be 1, the operation proceeds to step S241-05.

In step S241-05, the OBMC unit 241B determines not to apply the OBMC in the current sub-block, and the operation ends.

Here, obmc_flag is a syntax indicating the applicability of the OBMC in units of blocks to be decoded. A value of obmc_flag of 0 indicates that the OBMC is not applied, and a value of obmc_flag of 1 indicates that the OBMC is applied.

As to whether the value of obmc_flag is 0 or 1, the decoding unit 210 decodes and specifies the value, or estimates the value without decoding.

Since a decoding method for obmc_flag, and a specification method and an estimation method for the value of obmc_flag can have the same configurations as those of Non Patent Literature 2, a detailed description thereof will be omitted.

In step S241-04, the OBMC unit 241B determines whether or not an adjacent block crossing a block boundary with respect to the current sub-block has a motion vector (MV).

In a case where the OBMC unit 241B determines that such a condition is satisfied, the operation proceeds to step S241-06, and in a case where the OBMC unit 241B determines that such a condition is not satisfied, the operation proceeds to step S241-07.

In step S241-07, the OBMC unit 241B determines not to apply the OBMC in the current sub-block, and the operation ends.

In step S241-06, the OBMC unit 241B determines whether or not a difference between the MV of the current sub-block and the MV of the adjacent block is equal to or larger than a predetermined threshold.

In a case where the OBMC unit 241B determines that such a condition is satisfied, the operation proceeds to step S241-08, and in a case where the OBMC unit 241B determines that such a condition is not satisfied, the operation proceeds to step S241-09.

In step S241-08, the OBMC unit 241B determines to apply the OBMC in the current sub-block, and the operation ends. On the other hand, in step S241-09, the OBMC unit 241B determines not to apply the OBMC in the current sub-block, and the operation ends.

Here, a fixed value may be used as the predetermined threshold. For example, the predetermined threshold may be one sample. Alternatively, 0 samples may be used (that is, it is determined to apply the OBMC only when there is no complete match).

Alternatively, a variable value corresponding to the number of MVs included in the current sub-block may be used as the predetermined threshold. For example, in a case where the current sub-block has one MV, the predetermined threshold may be set to one sample, and in a case where the current sub-block has two MVs, the predetermined threshold may be set to 0.5 samples.

With the above configuration, in Non Patent Literature 2, discontinuity (hereinafter, referred to as block boundary distortion) of a block boundary between the current sub-block and an adjacent block is eliminated by applying the OBMC only in a case where the difference in MV between the current sub-block having the MV and the adjacent block is large, and as a result, the improvement of the prediction performance can be expected.

(OBMC Application Example and OBMC Application Control Method for GPM)

Hereinafter, an OBMC application example and an OBMC application control method for the GPM related to the decoding unit 210, the MC unit 241A, the OBMC unit 241B, and the blending unit 243 will be described with reference to FIGS. 11 and 12.

Figure 11:
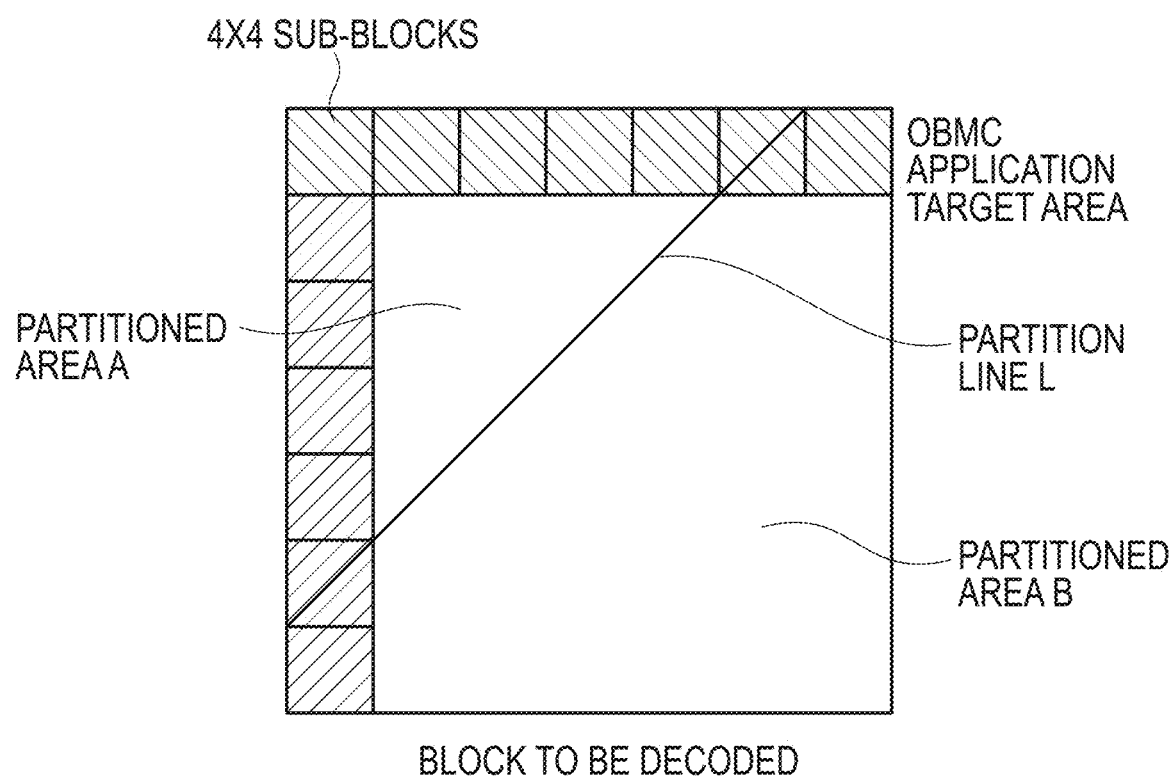
FIG. 11 illustrates an example of application of the OBMC to a block to which the GPM is applied in the present embodiment.

FIG. 11 illustrates an OBMC application example for block boundaries on the upper side and the left side of a block to be decoded for a block to which the GPM is applied in the present embodiment.

As illustrated in FIG. 11, there are a maximum of three patterns in the current sub-block to which the OBMC is applied according to the partitioning shape (partition line L) of the GPM.

Specifically, a first pattern includes a current sub-block belonging to the partitioned area A, a second pattern includes a current sub-block belonging to the partitioned area B, and a third pattern includes a current sub-block belonging to both the partitioned areas A/B.

The current sub-blocks of the three patterns are further partitioned depending on whether the prediction type applied to the partitioned area A and the partitioned area B is inter prediction or intra prediction.

Specifically, the current sub-blocks of the first pattern and the second pattern are partitioned into two cases of inter prediction and intra prediction.

On the other hand, the current sub-block of the third pattern is partitioned into a total of three cases of two different inter predictions, inter prediction and intra prediction, and two different intra predictions.

In the present embodiment, the current sub-block has only one prediction type. Therefore, in the current sub-block of the third pattern, the prediction type of the current sub-block is determined by a combination of two predictions included in the current sub-block. Specifically, a prediction type including two different inter predictions is treated as inter prediction, a prediction type including inter prediction and intra prediction is treated as inter prediction, and a prediction type including two different intra predictions is treated as intra prediction.

Here, it should be determined that the OBMC is not applicable to the current sub-block whose prediction type is intra prediction among the current sub-blocks that are OBMC application targets for the following reason. This is because the prediction sample of the current sub-block under the same condition is generated by intra prediction using a reconstruction sample adjacent to the current sub-block, and thus block boundary distortion is less likely to qualitatively occur at a block boundary between the reconstruction sample and the generated prediction sample as in inter prediction.

For the above reason, in the present embodiment, the application of the OBMC is restricted to the current sub-block whose prediction type is intra prediction among the current sub-blocks that are the OBMC application targets (the OBMC is not applicable).

On the other hand, in the present embodiment, the OBMC is applicable to the current sub-block whose prediction type is inter prediction among the current sub-blocks that are the OBMC application targets.

Figure 12:
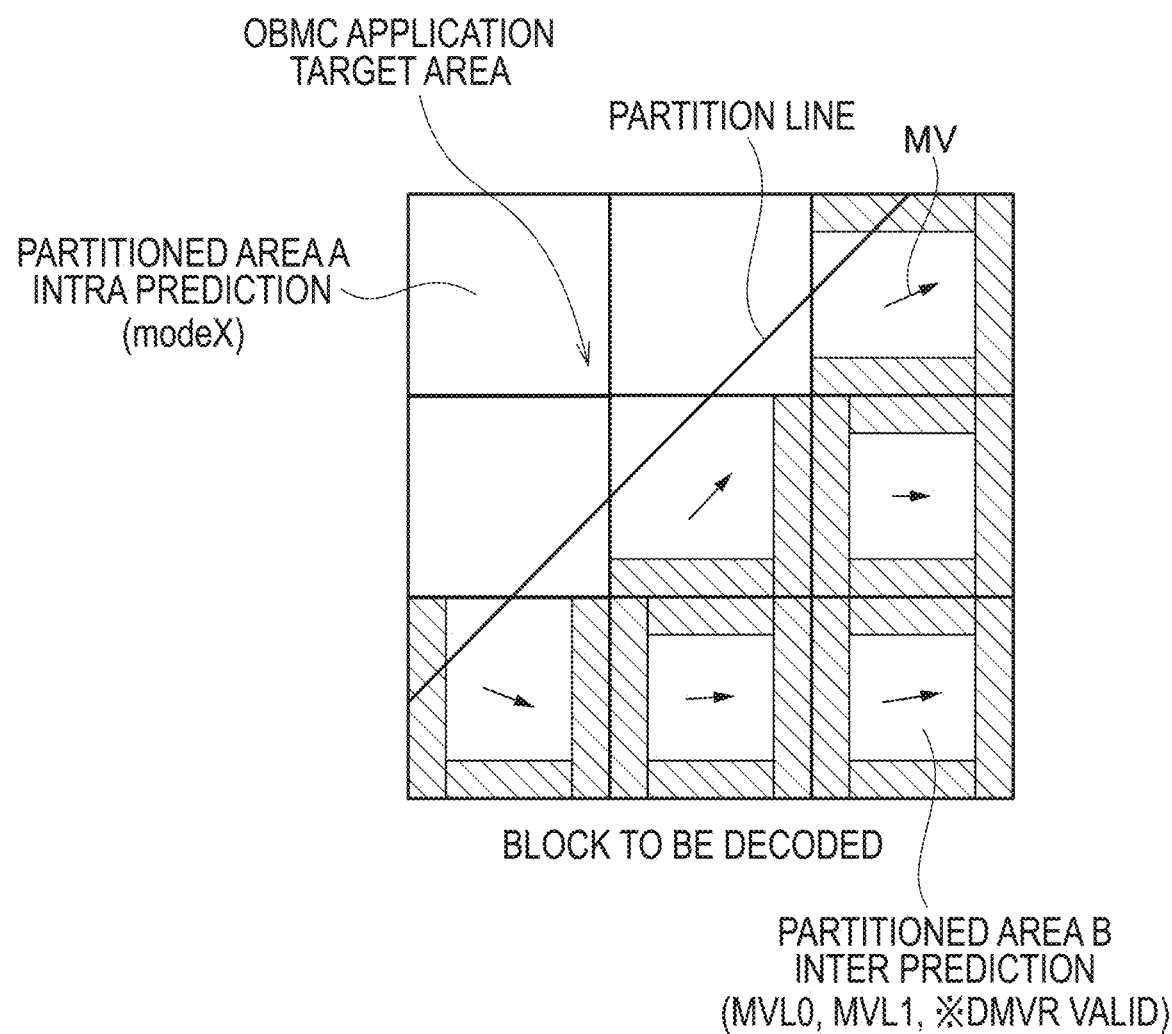
FIG. 12 is a diagram illustrating an example in which, in a case where bi-prediction is applied to an inter prediction area of an intra/inter-GPM in the present embodiment, decoder motion vector refinement (DMVR) is applied to the area, and motion vectors of predetermined block sizes constituting the area are different, the OBMC is applied to upper, lower, left, and right block boundaries of the blocks.

FIG. 12 is a diagram illustrating an example in which, in a case where bi-prediction is applied to the inter prediction area of the intra/inter-GPM in the present embodiment, the DMVR is applied to the area, and motion vectors of predetermined block sizes constituting the area are different, the OBMC is applied to upper, lower, left, and right block boundaries of the blocks.

In the case of FIG. 12, the application of the OBMC may be restricted (prohibited) in the intra area, similarly to the case described above.

Furthermore, in the case of FIG. 12, for the OBMC applied to the upper, lower, left, and right block boundaries for each predetermined block size constituting the block to be decoded, the applicability of the OBMC may be determined again based on the method for controlling the application of the OBMC in units of blocks illustrated in FIG. 10.

Specifically, as illustrated in FIG. 12, it is possible to avoid unnecessary application of the OBMC by controlling not to apply the OBMC to a block boundary where the intra area is adjacent in the current sub-block.

Hereinafter, a method for generating the final prediction sample in consideration of the applicability of the OBMC to the GPM according to the present embodiment will be described.

(Method for Generating Final Prediction Sample in Consideration of GPM, LMCS, and OBMC)

Hereinafter, a method for generating the final prediction sample in consideration of the GPM, the LMCS, and the OBMC related to the MC unit 241A, the OBMC unit 241B, the intra prediction unit 242, the luma mapping unit 270, and the blending unit 243 according to the present embodiment will be described.

(Weighting Factor of OBMC)

First, a definition of a first weighting factor $w\_1$ of the OBMC according to Non Patent Literature 2 and the present embodiment related to the MC unit 241A, the OBMC unit 241B, and the blending unit 243, and a method for generating a final inter prediction sample using the first weighting factor $w\_1$, the MC sample, and the OBMC sample will be described.

The blending unit 243 performs weighted averaging (blending) of the MC sample and the OBMC sample output from the luma mapping unit 270 by using the first weighting factor $w\_1$ set based on a distance from the boundary of the current block or the current sub-block to generate the final inter prediction sample.

In Non Patent Literature 2, different numbers of application lines and different weighting factors are set as the first weighting factor between the OBMC for the current block and the OBMC for the current sub-block.

Specifically, in the OBMC for the current block, four lines from the boundary of the current block are OBMC application areas, and the first weighting factor $w\_1$ is set as follows according to a number of the application line (i=0, 1, 2, or 3, and 0 is the line nearest to the block boundary).

$$w\_1[0, 1, 2, 3] = [6, 4, 2, 1]$$

At this time, a luma component (Inter_Y) of the final inter prediction sample is calculated as follows by using the first weighting factor w_1, the MC sample (MC_Y), and the OBMC sample (OBMC_Y).

$$Inter_Y = \frac{(32 - w_1) \times MC_Y + w_1 \times OBMC_Y}{32} \quad \text{[Expression 1]}$$

On the other hand, in the OBMC for the current sub-block, three lines from the boundary of the current block are OBMC application areas, and the first weighting factor w_1 is set as follows according to a number of the application line (i=0, 1, 2, or 3, and 0 is the line nearest to the block boundary).

$$w\_1[0, 1, 2, 3] = [27, 16, 6, 0]$$

At this time, the luma component (Inter_Y) of the final inter prediction sample is calculated as follows by using the first weighting factor w_1, the MC sample (MC_Y), and the OBMC sample (OBMC_Y).

$$Inter_Y = \frac{(128 - w_1) \times MC_Y + w_1 \times OBMC_Y}{128} \quad \text{[Expression 2]}$$

Note that the MC sample (MC_Y) in [Expression 2] indicates an MC sample subjected to weighted averaging (blending) based on a second weighting factor related to the GPM to be described later and the MC sample of each of the partitioned areas A/B in a case where the GPM is the inter/inter-GPM.

On the other hand, the MC sample (MC_Y) of [Expression 2] indicates an MC sample in which any one of the partitioned areas A/B is the inter prediction in a case where the GPM is the inter/intra-GPM.

Note that, in a case where the GPM is the intra/intra-GPM, each of the partitioned areas A/B includes the intra prediction sample, and thus, in the method for generating the inter prediction sample using the MC sample and the OBM sample in [Expression 2], the final prediction sample by the GPM is not generated.

(Weighting Factor of GPM)

Hereinafter, the second weighting factor w_2 of the GPM related to the decoding unit 210, the MC unit 241A, the intra prediction unit 242, and the blending unit 243 according to Non Patent Literature 1 and the present embodiment will be described with reference to FIGS. 13 to 15.

Figure 13:
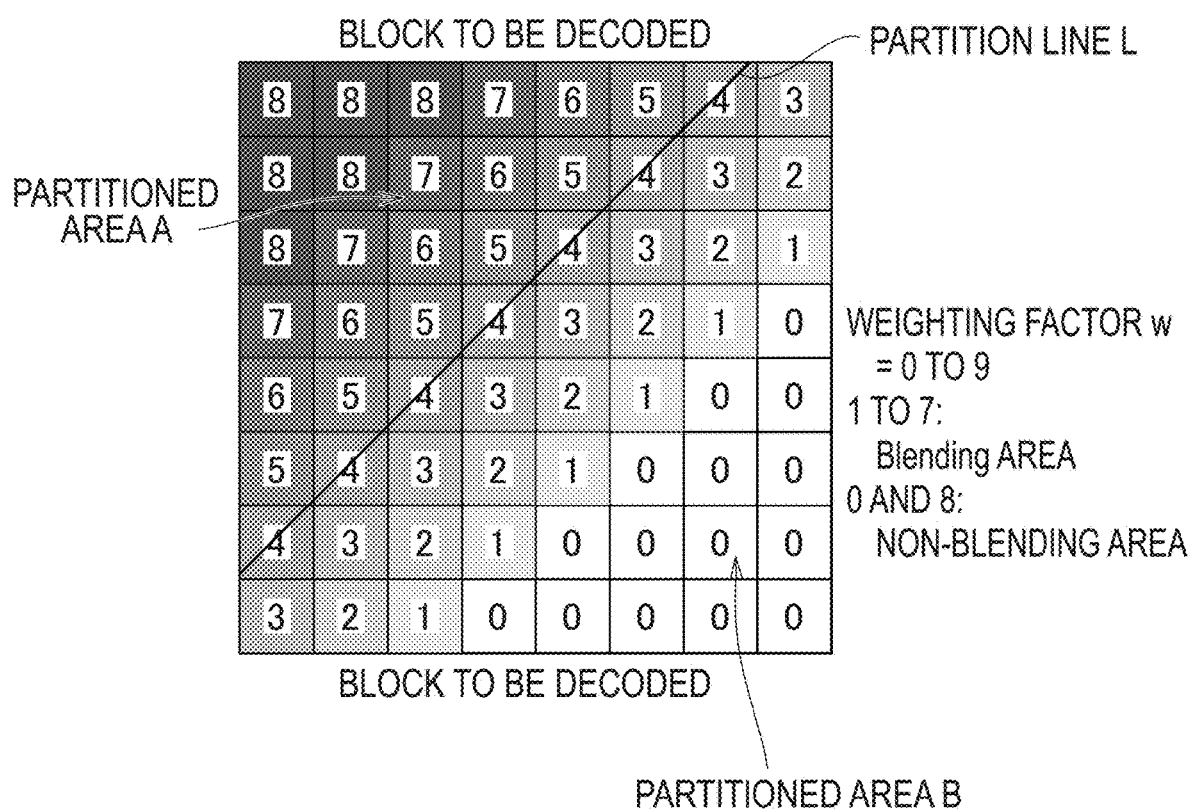
FIG. 13 is a diagram illustrating an example of a value of a weighting factor w for a prediction sample of each partitioned area A/B of the GPM according to Non Patent Literature 1 and the present embodiment.

FIG. 13 is a diagram illustrating an example of a value of the second weighting factor w_2 for the prediction sample of each of the partitioned areas A/B of the GPM according to Non Patent Literature 1 and the present embodiment.

Based on a combination of the prediction types of the GPM (inter/inter-GPM, intra/inter-GPM, and intra/intra-GPM) and the applicability of the OBMC to each of the partitioned areas A/B, the inter prediction sample generated by the MC unit 241A and the OBMC unit 241B or the intra prediction sample generated by the intra prediction unit 242 are subjected to weighted averaging (blending) by using the second weighting factor w_2 in the blending unit 243.

In Non Patent Literature 1, a value of 0 to 8 is used as the value of the second weighting factor w_2, and the value of the second weighting factor w_2 may also be used in the present embodiment. Here, values 0 and 8 of the second weighting factor w_2 indicate a non-blending area, and values 1 to 7 of the second weighting factor w_2 indicate a blending area.

Note that, in the present embodiment, a method for calculating the second weighting factor w_2 is similar to that of Non Patent Literature 1, and the second weighting factor w_2 can be calculated as follows from offset values (offsetX and offsetY) calculated from a sample position (xL,yL) and the current block size, displacements (diplacementX and diplacementY) calculated from angleIdx that defines the angle of the partition line of the geometric partitioning mode (GPM) illustrated in FIG. 14, and a table value disLut calculated from diplacementX and diplacementY illustrated in FIG. 15.

$$weightIdx = (((xL + \textit{offsetX}) \ll 1) + 1) + \times disLut[displacementX] +$$

$$(((yL + \textit{offsetY}) \ll 1) + 1) \times disLut[displacementY]$$

$$weightIdxL = \textit{partFlip}?32 + weightIdx : 32 - weightIdxw\_2 =$$

$$Clip3(0, 8, (weightIdxL + 4) \gg 3)$$

The final prediction sample by the GPM is generated according to the prediction type of each of the partitioned areas A/B using the above-described second weighting factor w_2.

First, in the case of the inter/inter-GPM, the MC sample (MC_Y) by the GPM is generated as follows using the second weighting factor w_2, a luma component (MC_AY) of the MC sample (that is, the MC sample based on the motion information of the area A) of the partitioned area A, and each luma component (MC_BY) of the MC sample (that is, the MC sample based on the motion information of the area B) of the partitioned area B.

$$MC_Y = \frac{(8 - w_2) \times MC_{AY} + w_2 \times MC_{BY}}{8} \quad \text{[Expression 3]}$$

In the blending unit 243, in a case where the OBMC is valid, the OBMC sample (OBMC_Y) and the MC sample (MC_Y) are subjected to weighted averaging by [Expression 1] or [Expression 2] described above, and the inter prediction sample (Inter_Y) by the GPM is generated. Then, such an inter prediction sample is output from the blending unit 243 as a final prediction sample (Pred_Y) by the GPM.

Next, in the case of the intra/intra-GPM, the intra prediction sample (Intra_Y) by the GPM is generated as follows using the second weighting factor w_2, a luma component (Intra_AY) of the intra prediction sample (that is, the intra sample based on the intra prediction mode of the area A) of the partitioned area A, and each luma component (Intra_BY)

of the intra sample (that is, the intra sample based on the intra prediction mode of the area A) of the partitioned area B.

$$\text{Intra}_Y = \frac{(8 - w_1) \times \text{Intra}_{AY} + w_2 \times \text{Intra}_{BY}}{8} \quad \text{[Expression 4]}$$

As described above, since it is not necessary to apply the OBMC sample to the prediction sample by the GPM including only the intra prediction sample, the intra prediction sample is output from the blending unit 243 as the final prediction sample (Pred_Y) by the GPM.

Next, in the case of the intra/inter-GPM, the final prediction sample by the GPM is generated as follows using the second weighting factor w_2, the MC sample (that is, the MC sample based on the motion information of the area A or B) of the partitioned area A or B, the intra prediction sample (that is, the intra sample based on the intra prediction mode of the area B or A) of the partitioned area B or A, and each luma component of the OBMC sample for the MC sample of the partitioned area A or B. The following calculation expression shows an example in which the partitioned area A is inter prediction (MC) and the partitioned area B is intra prediction.

The inter prediction sample (Inter_AY) by the GPM is calculated based on the MC sample and the OBMC sample in the partitioned area A or B and the first weighting factor by $$\text{Intra}_{AY} = \frac{(32 - w_1) \times MC_{AY} + w_1 \times OBMC_Y}{32} \quad \text{[Expression 5]}$$

or $$\text{Inter}_{AY} = \frac{(128 - w_1) \times MC_{AY} + w_1 \times OBMC_Y}{128}. \quad \text{[Expression 6]}$$

Then, the final prediction sample (Pred_Y) by the GPM is generated based on the inter prediction sample by the GPM, the intra prediction sample by the GPM (the intra prediction sample of the partitioned area B in this example), and the second weighting factor by $$\text{Pred}_Y = \frac{(8 - w_2) \times \text{Inter}_{AY} + w_2 \times \text{Intra}_{BY}}{8} \quad \text{[Expression 7]}$$

and output from the blending unit 243.

In the blending unit 243, in a case where the LMCS is valid, the final prediction sample in the luma component of the current block is generated by the luma-mapped MC sample and the OBMC sample output from the luma mapping unit 270 or the luma-mapped intra prediction sample output from the intra prediction unit 242.

In particular, in the case of the intra/inter-GPM in the above-described calculation example, the blending unit 243 needs to appropriately perform a procedure of the weighted averaging of the luma-mapped MC sample, OBMC sample, and intra prediction sample.

Specifically, the blending unit 243 generates a luma-mapped inter prediction sample (FwdMap(Inter_Y)) that is obtained by performing weighted averaging based on a luma-mapped MC sample (FwdMap(MC_Y)) and OBMC sample (FwdMap(OBMC_Y)) of the partitioned area A or B output from the luma mapping unit 270 and the first weighting factor w_1, as in the following expression.

Then, the blending unit 243 generates the final prediction sample (Pred_Y) by the GPM based on the inter prediction sample, the luma-mapped intra prediction sample (Intra_Y) of the partitioned area B or A output from the intra prediction unit 242, and the second weighting factor w_2. The following calculation expression shows an example in which the partitioned area A is inter prediction (MC) and the partitioned area B is intra prediction. Here, a method for generating the inter prediction sample (Inter_AY) is similar to the above [Expression 5] or [Expression 6].

$$\text{Pred}_Y = \frac{(8 - w_2) \times \text{FwdMap(Inter}_{AY}) + w_2 \times \text{Intra}_{BY}}{8} \quad \text{[Expression 8]}$$

According to the above procedure, in a case where all of the GPM, the OBMC, and the LMCS are valid for the current block and the GPM includes inter prediction and intra prediction, the prediction sample of the luma component of the current block can be generated by blending the luma-mapped MC sample, OBMC sample, and intra prediction sample by the GPM.

This means that signal spaces of the above-described three prediction samples (1. the MC sample by the GPM, 2. the OBMC sample, and 3. the Intra prediction sample by the GPM) are aligned in a luma-mapped space, and then the final prediction sample of the intra/inter-GPM is generated, and as a result, the effect of improving the prediction performance can be expected.

Note that, even in a case where the first weighting factor w_1 and the second weighting factor w_2 described above are values different from those in the above example, the same concept can be applied to the method for generating the prediction sample when the GPM, the OBMC, or the LMCS described in the present embodiment is valid.

Furthermore, as a modification of the above-described configuration, the blending unit 243 may have a function of performing the luma mapping on the MC sample and the OBMC sample in the second luma mapping unit 270.

Specifically, the blending unit 243 generates the inter prediction sample by the GPM or the OBMC from the MC sample output from the MC unit 241A, the OBMC sample output from the OMBC unit, the first weighting factor, and the second weighting factor.

Thereafter, the blending unit 243 performs luma mapping on the generated inter prediction sample. Then, in a case where the GPM is, for example, the intra/inter-GPM, the blending unit 243 may perform weighted averaging of the intra prediction sample output from the intra prediction unit 242 and the inter prediction sample based on the second weighting factor, and generate and output the final prediction sample.

As a result, in the above-described configuration example, the luma mapping processing is necessary for each of the MC sample and the OBMC sample, but in the modification, since the luma mapping may be performed only on the inter prediction sample, an effect of reducing the number of times the luma mapping processing is performed can be expected.

(Inverse Chroma Scaling Considering Partitioning Shape of GPM)

Figure 18:
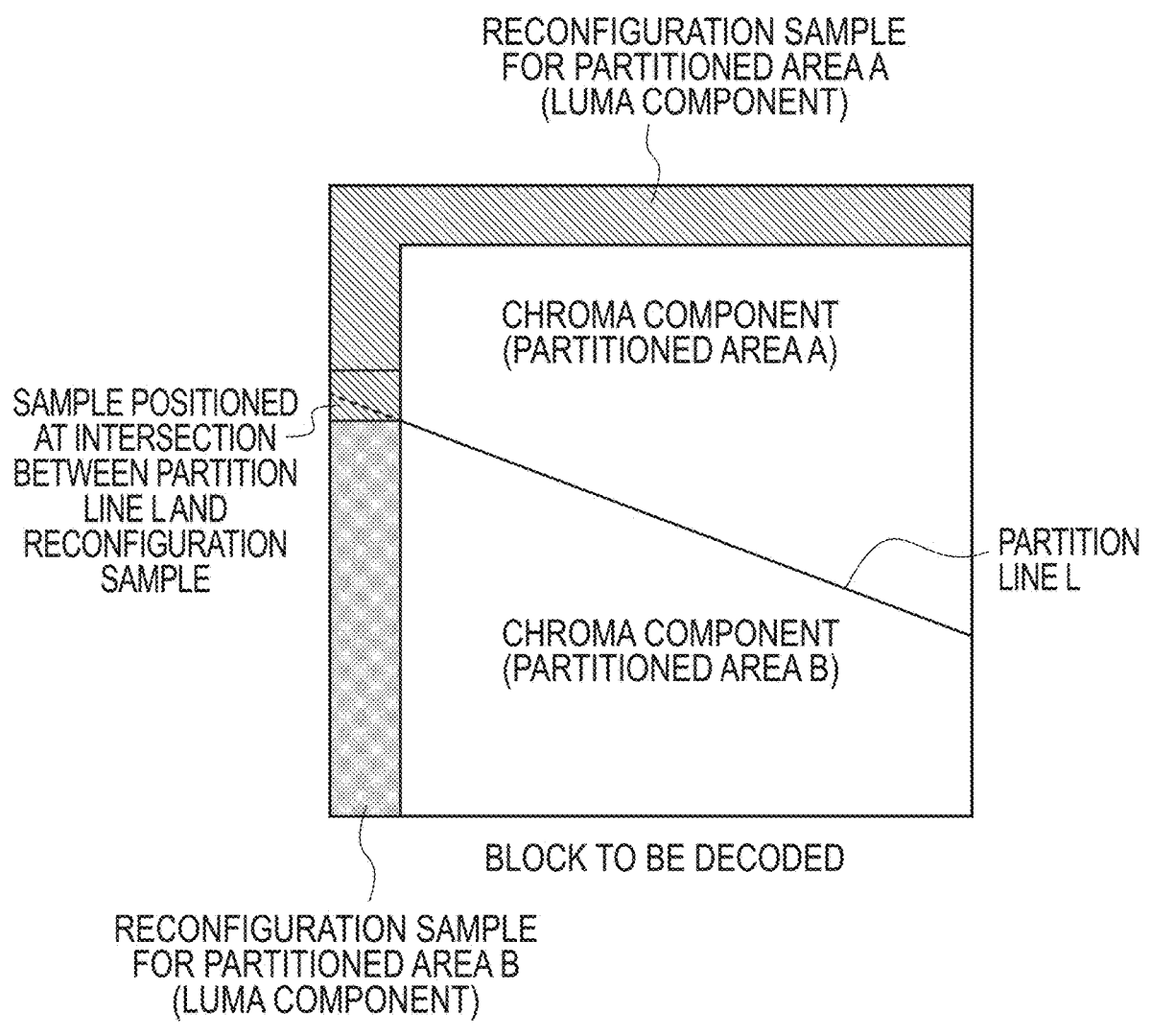

Hereinafter, an inverse chroma scaling method considering the partitioning shape of the GPM according to the present embodiment will be described with reference to FIGS. 16 to 18. Note that, since the chroma scaling method according to the present embodiment is performed by a reverse procedure to the inverse chroma scaling method described here, all the points related to the partitioning shape described below are common. Therefore, a part described as the inverse chroma scaling method can also be read as the chroma scaling method.

Figure 16:
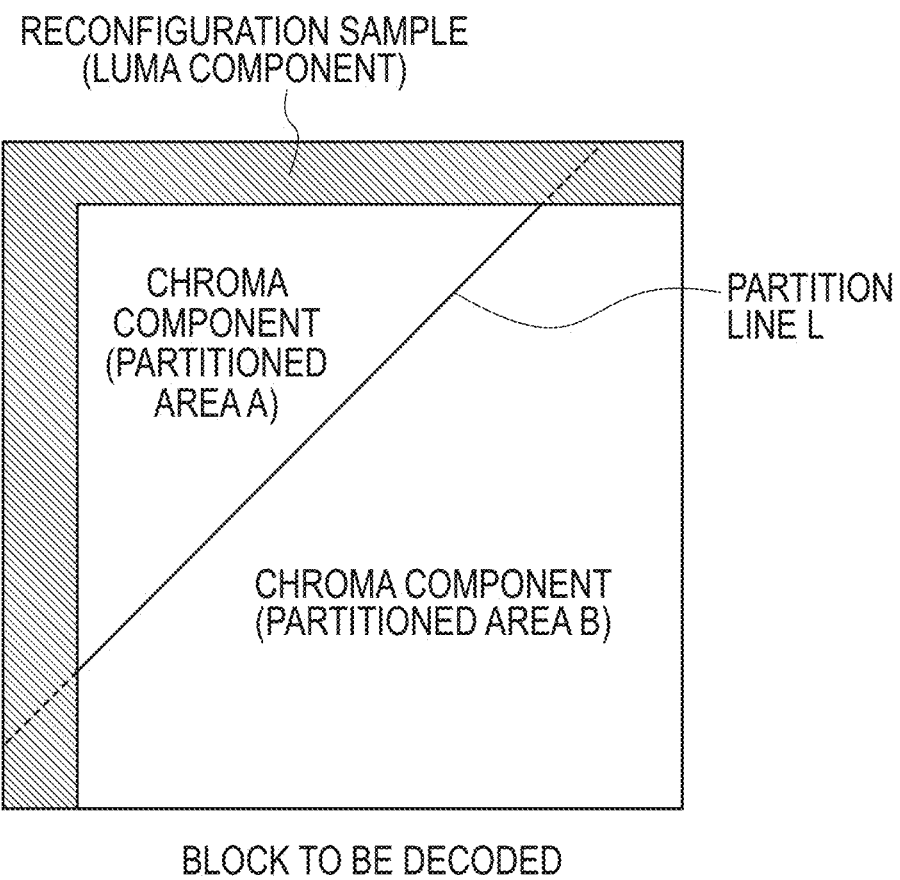
FIG. 16 is a diagram illustrating an example of an inverse chroma scaling method considering a partitioning shape of the GPM according to the present embodiment.

FIG. 16 is a diagram illustrating an example of the inverse chroma scaling method in consideration of the partitioning shape of the GPM according to the present embodiment.

First, the inverse chroma scaling method for the GPM disclosed in Non Patent Literature 1 is applied to the prediction residual sample in units of the current blocks, not for each of the partitioned areas A/B.

Therefore, a scaling coefficient used at this time is calculated using the average value of the luma components of reconstruction blocks (specifically, reconstruction samples adjacent to the upper one line and the left one line) adjacent to the current block. A method for calculating the scaling coefficient is the same even in a case where the GPM is valid.

On the other hand, in the present embodiment, as illustrated in FIG. 16, the inverse chroma scaling may be applied separately to the partitioned areas A/B of the GPM.

Such an application can be implemented by storing information (internal parameter) related to the partitioning shape of the GPM until the processing in the inverse chroma scaling unit 281 (or the inverse chroma scaling unit 181) is completed.

Furthermore, for the method for calculating the scaling coefficient used at this time, a method considering the partitioning shape of the GPM described below may be applied (replaced) as an alternative.

Specifically, a table in which reference areas of the partitioned areas A/B are set based on the angle of the partition line L of the GPM as illustrated in FIG. 17 is used. Here, A and L illustrated in FIG. 17 indicate an upper portion and a left portion of the current block, respectively.

If the reconstruction sample of the luma component used at the time of calculating the scaling coefficient in the inverse chroma scaling method is limited using this table, the scaling coefficient of each of the partitioned areas A/B can be calculated using only the reconstruction sample according to the partitioning shape, so that the accuracy of the prediction residual sample of the chroma component is improved, and as a result, the prediction performance is improved.

Note that, in the above description, the method for calculating the scaling coefficient in the inverse chroma scaling method using the table for limiting the reference areas based on the partitioning shape of the GPM has been described. However, as another method, the luma component of the reconstruction sample used for calculation of the scaling coefficient may be limited by an intersection of the partition line L of the GPM and the luma component of the reconstruction sample adjacent to the current block as illustrated in FIG. 18. Here, a sample positioned at the intersection may be used in only one or both of the partitioned areas A/B.

Note that, in the above description, a signaling method at the time of applying the intra prediction mode to the GPM has been described with reference to a case where a rectangular block is partitioned into two areas by the GPM. However, even in a case where the rectangular block is partitioned into three or more areas by the GPM, a method related to application of intra prediction to the GPM, derivation of the intra prediction mode, application of the OBMC to the GPM, and generation of the prediction sample in a case where the GPM, the OBMC, and the LMCS are valid, described in the present embodiment, can be applied with a similar concept.

Further, the image encoding device 100 and the image decoding device 200 may be realized as a program causing a computer to execute each function (each step).

Note that the above described embodiments have been described by taking application of the present invention to the point cloud encoding device 10 and the point cloud decoding device 30 as examples. However, the present invention is not limited only thereto, but can be similarly applied to an encoding/decoding system having functions of the encoding device 10 and the decoding device 30.

According to the present embodiment, it is possible to improve the overall quality of service in video communications, thereby contributing to Goal 9 Of the UN-led Sustainable Development Goals (SDGs) which is to "build resilient infrastructure, promote inclusive and sustainable industrialization and foster innovation".

What is claimed is:

1. An image decoding device comprising a circuit, wherein the circuit:

generates a motion compensation sample for a current block;

generates an overlapped block motion compensation sample for the current block;

performs luma mapping on luma components of the motion compensation sample and the overlapped block motion compensation sample for the current block;

generates an intra prediction sample for the current block;

blends the motion compensation sample, the overlapped block motion compensation sample, and the intra prediction sample for the current block; and blends, in a case where all of a geometric partitioning mode, overlapped block motion compensation, and luma mapping with chroma scaling are valid for the current block, and the geometric partitioning mode includes inter prediction and intra prediction, luma-mapped luma components of the motion compensation sample, the overlapped block motion compensation sample, and the intra prediction sample to generate a prediction sample for a luma component of the current block.

2. The image decoding device according to claim 1, wherein the circuit:

generates the luma-mapped luma component of the inter prediction sample for the current block by performing weighted averaging of the luma-mapped luma component of the motion compensation sample and the luma-mapped luma component of the overlapped block motion compensation sample by using a first weighting factor, performs weighted averaging of the luma-mapped luma component of the inter prediction sample and the luma-mapped luma component of the intra prediction sample by using a second weighting factor, and generates the prediction sample for the luma component of the current block.

3. An image decoding device comprising a circuit, wherein
the circuit:
  generates a motion compensation sample for a current block;
  generates an intra prediction sample for the current block;
  performs inverse chroma scaling on a chroma component of a prediction residual sample for the current block;
  blends the motion compensation sample and the intra prediction sample for the current block; and
  independently applies inverse chroma scaling to each of partitioned areas in a geometric partitioning mode in a case where the geometric partitioning mode and luma mapping with chroma scaling are valid for the current block.

4. The image decoding device according to claim 3, wherein
the circuit controls a range of reconstruction samples of a luma component adjacent to the current block to be used for calculation of a scaling coefficient according to a partitioning shape of the geometric partitioning mode.

5. The image decoding device according to claim 4, wherein
the circuit controls the range of the reconstruction samples by using a table indicating a reference direction of the reconstruction samples defined based on a partitioning angle of the geometric partitioning mode.

6. An image decoding method executed by a circuit of an image decoding device, the method comprising:
  generating a motion compensation sample for a current block;
  generating an overlapped block motion compensation sample for the current block;
  performing luma mapping on luma components of the motion compensation sample and the overlapped block motion compensation sample for the current block;
  generating an intra prediction sample for the current block; and
  blending the motion compensation sample, the overlapped block motion compensation sample, and the intra prediction sample for the current block, wherein
  in the blending, in a case where all of a geometric partitioning mode, overlapped block motion compensation, and luma mapping with chroma scaling are valid for the current block, and the geometric partitioning mode includes inter prediction and intra prediction, luma-mapped luma components of the motion compensation sample, the overlapped block motion compensation sample, and the intra prediction sample are blended to generate a prediction sample for a luma component of the current block.

7. A non-transitory computer-readable medium having stored thereon a program that is executable by a computer to cause the computer to function as an image decoding device including a circuit configured to:
  generate a motion compensation sample for a current block;
  generate an overlapped block motion compensation sample for the current block;
  perform luma mapping on luma components of the motion compensation sample and the overlapped block motion compensation sample for the current block;
  generate an intra prediction sample for the current block;
  blend the motion compensation sample, the overlapped block motion compensation sample, and the intra prediction sample for the current block; and
  blend, in a case where all of a geometric partitioning mode, overlapped block motion compensation, and luma mapping with chroma scaling are valid for the current block, and the geometric partitioning mode includes inter prediction and intra prediction, luma-mapped luma components of the motion compensation sample, the overlapped block motion compensation sample, and the intra prediction sample to generate a prediction sample for a luma component of the current block.

* * * * *